US010844195B2

United States Patent
Santamaria et al.

(10) Patent No.: US 10,844,195 B2
(45) Date of Patent: *Nov. 24, 2020

(54) ADDITIVE COMPOSITION, METHOD OF BLENDING SAME AND A LOW HAZE POLYOLEFIN MATERIAL AND PREPARATION THEREOF

(71) Applicant: NJC EUROPE LIMITED, Chadderton (GB)

(72) Inventors: Estibaliz Santamaria, Chadderton (GB); Hieu-Dinh Phan, Chadderton (GB); Sukehiro Niga, Kyoto (JP); Yohei Uchiyama, Kyoto (JP)

(73) Assignee: NJC EUROPE LIMITED, Oldham (GB)

( * ) Notice: Subject to any disclaimer, the term of this patent is extended or adjusted under 35 U.S.C. 154(b) by 10 days.

This patent is subject to a terminal disclaimer.

(21) Appl. No.: 16/094,947

(22) PCT Filed: Apr. 19, 2017

(86) PCT No.: PCT/GB2017/051094
§ 371 (c)(1),
(2) Date: Oct. 19, 2018

(87) PCT Pub. No.: WO2017/182805
PCT Pub. Date: Oct. 26, 2017

(65) Prior Publication Data
US 2020/0017657 A1  Jan. 16, 2020

(30) Foreign Application Priority Data

Apr. 19, 2016 (GB) .................................. 1606826.4

(51) Int. Cl.
C08K 5/1575 (2006.01)
C08K 5/41 (2006.01)
(Continued)

(52) U.S. Cl.
CPC ............ *C08K 5/1575* (2013.01); *C08K 5/005* (2013.01); *C08K 5/0041* (2013.01);
(Continued)

(58) Field of Classification Search
CPC .. C08K 5/1575; C08K 5/0041; C08K 5/0005; C08K 5/0083; C08K 2201/014; C08L 23/02; C08L 2201/08; C08L 2201/10
(Continued)

(56) References Cited

U.S. PATENT DOCUMENTS 3,449,257 A  6/1969 Tuite et al.
4,429,140 A  1/1984 Murai et al.
(Continued)

FOREIGN PATENT DOCUMENTS

EP  2719725 A1  4/2014
EP  3184584 A1  6/2017
(Continued)

OTHER PUBLICATIONS

Great Britain Search Report for Application No. GB1606826.4, dated Sep. 26, 2016.
(Continued)

*Primary Examiner* — William K Cheung
(74) *Attorney, Agent, or Firm* — Ryan T. Grace; Advent, LLP

(57) ABSTRACT

The present invention relates to an additive composition and a low haze polyolefin material which may be prepared using said additive composition. In particular, the polyolefin material is prepared from a polyolefin resin composition comprising one or more optical brighteners, bis-3,4-dimethylbenzylidene sorbitol and bis-p-ethylbenzylidene sorbitol at a certain weight ratio. In an aspect, the present invention relates to a method for forming a polyolefin material; said method comprising:
(Continued)

Figure 1:
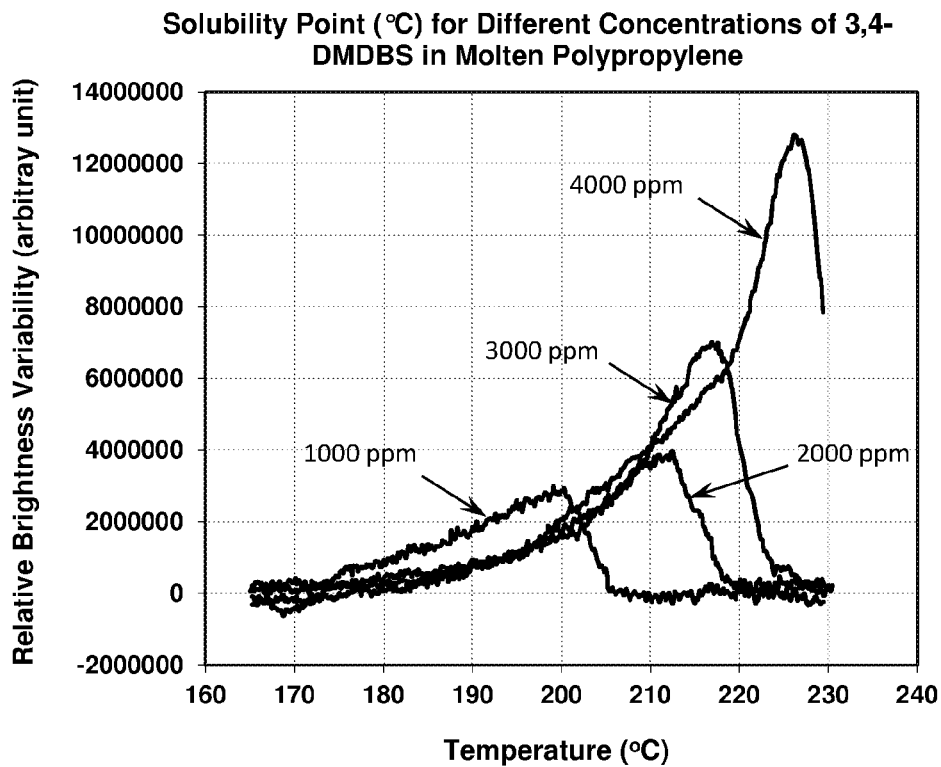

(i) preparing a polyolefin resin composition comprising polyolefin resin, one or more optical brighteners, bis-3,4-dimethylbenzylidene sorbitol and bis-p-ethylbenzylidene sorbitol, wherein the weight ratio of bis-3,4-dimethylbenzylidene sorbitol to bis-p-ethylbenzylidene sorbitol in the polyolefin resin composition is 45:55 to 25:75;

(ii) processing said polyolefin resin composition to form said polyolefin material.

20 Claims, 5 Drawing Sheets

(51) Int. Cl.
*C08K 5/05* (2006.01)
*C08L 23/02* (2006.01)
*C08K 5/00* (2006.01)

(52) U.S. Cl.
CPC ...... *C08K 5/0083* (2013.01); *C08K 2201/014* (2013.01); *C08L 23/02* (2013.01); *C08L 2201/08* (2013.01); *C08L 2201/10* (2013.01)

(58) Field of Classification Search
USPC .......................................... 524/108
See application file for complete search history.

(56) References Cited

U.S. PATENT DOCUMENTS

| | | |
|---|---|---|
| 4,902,807 A | 2/1990 | Kobayashi et al. |
| 6,989,154 B2 | 1/2006 | Lake et al. |
| 7,501,462 B2 | 3/2009 | Xu et al. |
| 2002/0161076 A1 | 10/2002 | Lake, Jr. et al. |
| 2005/0148720 A1* | 7/2005 | Li .................. C08K 5/01 524/474 |

FOREIGN PATENT DOCUMENTS

| | | |
|---|---|---|
| GB | 2531301 A | 4/2016 |
| WO | 02074284 A1 | 9/2002 |
| WO | 2016102465 A1 | 6/2016 |

OTHER PUBLICATIONS

International Search Report for Application No. PCT/GB2017/051094, dated Jul. 17, 2017.

* cited by examiner

ADDITIVE COMPOSITION, METHOD OF BLENDING SAME AND A LOW HAZE POLYOLEFIN MATERIAL AND PREPARATION THEREOF

This application is a U.S. National Stage entry under 35 U.S.C. § 371 based on International Application No. PCT/EP2017/072766, filed Sep. 11, 2017, which was published under PCT Article 21(2) and which claims priority to European Application No. 16190361.2, filed Sep. 23, 2016, which are all hereby incorporated in their entirety by reference.

The present invention relates to an additive composition and a low haze polyolefin material which may be prepared using said additive composition. In particular, the polyolefin material is prepared from a polyolefin resin composition comprising one or more optical brighteners, bis-3,4-dimethylbenzylidene sorbitol and bis-p-ethylbenzylidene sorbitol, wherein bis-3,4-dimethylbenzylidene sorbitol and bis-p-ethylbenzylidene sorbitol are present in a ratio such that a low haze polyolefin material can be prepared at lower than conventional processing temperatures.

Dibenzylidene sorbitol (DBS) derivatives are a well-known class of nucleating agents/clarifying agents for modifying the crystallization process of polyolefin resins. Such compounds are known to: shorten cycle times (i.e. the time required to mould a single plastic part), as a result of more rapid solidification; improve mechanical properties, such as stiffness and heat resistance; and improve the optical properties of plastics, such as haze level, by eliminating large spherulites which scatter light (and are therefore also referred to as clarifying agents). These effects have, inter alia, allowed polypropylene and linear low density polyethylene plastics prepared with DBS derivatives to be used in place of expensive polyethylene terephthalate or polystyrene for containers and packaging products which require good optical clarity.

Unlike alternative nucleating agents, such as metal salts, silica and the like, DBS derivatives must typically be melted and uniformly dispersed/dissolved in the molten resin. Subsequent recrystallization of the DBS derivative forms a fine crystalline network providing nucleation sites, which reduce the size of spherulites formed in the resin as it cools, thereby reducing light scattering and improving clarity. In conventional moulding methods comprising the step of injecting or extruding a polyolefin resin containing a DBS derivative, the temperature of the molten resin is appreciably higher than the sol-gel transition temperature of the melt during the heating cycle. Furthermore, use of a nucleating agent having a high melting point has the disadvantage that the resin composition containing it must be moulded at commensurately high temperatures in order to solubilize the nucleating agent, leading to significant energy consumption.

For example, a crystalline resin composition containing as a nucleating agent either 1,3:2,4-bis(polyalkylbenzene)sorbitol or an unsymmetrical DBS derivative (wherein the two aromatic rings have different substituents) may provide a moulded article exhibiting desirable optical properties. However, the melting point of such nucleating agents is as high as 260° C., and so the resin composition must typically be processed at a correspondingly high temperature, so as to obtain adequate dissolution of the nucleating agent in the resin composition. If processing temperatures are too low, insufficient dissolution of the nucleating agent will result; leading to unsatisfactory levels of haze in the resulting polyolefin material.

As processing temperature is increased to accommodate such high melting point nucleating agents, energy consumption is also increased, undesirably. Furthermore, the cycle time for processing the plastic article may also be lengthened as a result of longer cooling periods. This negates advances continuously being made in lowering the temperature profiles of polyolefin resins, particularly polypropylene, such that melting temperatures are lowered and brought closer to crystallisation temperatures, which can reduce cooling periods and therefore cycle times. In a climate of ever-increasing energy prices, high processing temperatures can in effect preclude the economic viability of plastics preparation. Additionally, another problem that may arise with high processing temperatures is that DBS derivatives can sublimate when heated to temperatures near their melting points, for instance during the high temperature moulding operation, leading to unwanted re-deposition on moulding equipment (i.e. "plate-out").

U.S. Pat. No. 5,198,484 describes a process of milling sorbitol and xylitol nucleating agents to ultrafine particle size and "dissolving" in the resin at a temperature below that of the melting point of the particular nucleating agent. It was, however, noted in U.S. Pat. No. 5,198,484 (Example 3) that the clarifying agent is not necessarily homogenously distributed throughout the resin. This can lead to non-uniform haze reduction across the resulting plastic. Indeed, there is the possibility of opaque patching across the resulting plastic article, which is unlikely to be aesthetically acceptable as a consumer product. Another problem that arises as a result of the inhomogeneity of distribution of the nucleating agent is irregular spherulitic organization, meaning that the polymer micro-structure is not uniformly modified by the addition of the nucleating agent, as intended. This can negatively impact upon the macroscopic properties of the resulting plastic article and potentially make it unfit for purpose. Moreover, the process involves milling which requires additional equipment and processing steps, which outweigh any cost savings associated with processing at lower temperatures, at least in the short term.

A particularly preferred, but high cost, DBS derivative having a high nucleating efficiency and affording good organoleptic properties is bis-3,4-dimethylbenzylidene sorbitol (3,4-DMDBS). However, the use of 3,4-DMDBS requires high processing temperatures, otherwise there is a problem of unacceptable levels of haze in polyolefin articles prepared with this agent when processing temperatures are lower than 230° C. U.S. Pat. No. 7,351,758 and its corresponding continuation, U.S. Pat. No. 7,501,462, describe using a blend of 3,4-DMDBS and DBS (unsubstituted) nucleating agents to try and address this issue. However, improvements at lower processing temperatures, for example below 210° C., were only observed with polypropylene resins exhibiting high melt flow values of at least 20, preferably at least 50; which may require the use of a "vis-breaking agent" in order to reduce the viscosity of the polyolefin resin and increase the melt flow index.

U.S. Pat. No. 6,989,154 discloses a blend of 3,4-DMDBS and p-methyldibenzylidene sorbitol (MDBS) as a lower cost alternative to using 3,4-DMDBS alone as a clarifying agent. It is reported that the blend confers a good degree of clarification in terms of the haze level in polyolefin articles prepared using the blend. However, U.S. Pat. No. 6,989,154 teaches that the blend of 3,4-DMDBS and MDBS must be used in a resin composition processed at conventional high processing temperatures. Indeed, according to the example described in the experimental section of U.S. Pat. No. 6,989,154, the melt temperature of the resin and additive composition upon exit of the extruder die was as high as 246° C., whilst the moulder barrel was reportedly set to 220° C. Clearly, energy consumption in preparing a clarified polyolefin material as described in U.S. Pat. No. 6,989,154 is still very high.

U.S. Pat. No. 6,989,154 also describes alternative blends, including: 3,4-DMDBS/DBS; 3,4-DMDBS/EDBS; or 3,4-DMDBS/TDBS (1,3;2,4-bis(5',6',7',8'-tetrahydro-2-naphthylidene) sorbitol). However, these blends are reported not to exhibit any of the benefits of the 3,4-DMDBS/MDBS blend, as illustrated in results of the comparative examples in Table 2 of that document, which were processed under similarly high processing temperatures.

There remains a need for a means for broadening the range of temperature over which nucleated and clarified polyolefin materials may suitably be prepared by lowering the effective minimum processing temperature, without compromising haze values or organoleptic properties and whilst avoiding the problems or limitations associated with the prior art mentioned hereinbefore.

The present invention is based on the unexpected discovery that bis-3,4-dimethylbenzylidene sorbitol (3,4-DMDBS) and bis-p-ethylbenzylidene sorbitol (EDBS) (depicted below) exhibit a surprising synergy, when used in combination.

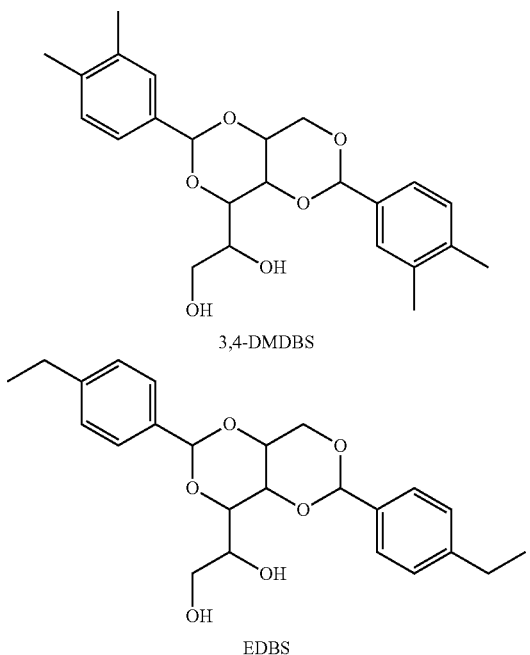

3,4-DMDBS

EDBS

Specifically, when these agents are added to a polyolefin resin in a 3,4-DMDBS to EDBS weight ratio of from 45:55 to 25:75, the minimum temperature at which the blend is soluble in the molten polyolefin resin ("solubility point") is consistently lower than for either of the individual agents of the blend alone. Furthermore, not only is there synergy between the components of the blend in terms of solubility in molten polyolefin resin, the blend also exhibits synergy with respect to transparency in the resulting nucleated and clarified polyolefin material prepared therefrom. Furthermore, this synergy is not impacted by the presence of one or more optical brighteners, which can further enhance desirable optical properties in the resulting nucleated and clarified polyolefin material, which is surprisingly obtainable at low processing temperature.

When 3,4-DMDBS and EDBS are added to a polyolefin resin in the above weight ratio and a polyolefin material is prepared therefrom at lower than conventional processing temperatures (e.g. below 200° C.), haze values exhibited by the polyolefin material are lower than for either of the agents of the blend alone. Synergistic effects are also considered to be illustrated by the finding of the inventors that blends of 3,4-DMDBS and EDBS, in the weight ratios according to the present invention, form a eutectic system, meaning that the melting point of the particular blend is lower than that of either of 3,4-DMDBS or EDBS alone.

Accordingly, the blend of 3,4-DMDBS and EDBS provides a means for effectively nucleating and clarifying a polyolefin resin at lower than conventional processing temperatures, thereby reducing energy consumption, whilst affording a polyolefin material having desirable optical properties. Furthermore, the present invention may be used for broadening the effective processing temperature range over which a desirably low haze polyolefin material may be prepared.

Thus, in a first aspect, the present invention provides a method for forming a polyolefin material, said method comprising: (i) preparing a polyolefin resin composition comprising polyolefin resin, one or more optical brighteners and bis-3,4-dimethylbenzylidene sorbitol and bis-p-ethylbenzylidene sorbitol, wherein the weight ratio of bis-3,4-dimethylbenzylidene sorbitol to bis-p-ethylbenzylidene sorbitol in the polyolefin resin composition is from 45:55 to 25:75; and (ii) processing said polyolefin resin composition to form said polyolefin material.

Preferably, processing of the polyolefin resin composition to form said polyolefin material is conducted at a temperature of from 180° C. to 245° C., preferably from 185° C. to 230° C. Other preferred processing temperature ranges used in the preparation of the polyolefin material include: 200° C. or below, for example from 180° C. to 200° C., more preferably from 185° C. to 198° C., even more preferably at a temperature of from 190° C. to 197° C., most preferably from 190° C. to 195° C.

In another aspect, the present invention also provides a method for reducing haze in a polyolefin material which is prepared by processing a polyolefin resin composition; said method comprising combining a polyolefin resin, one or more optical brighteners, bis-3,4-dimethylbenzylidene sorbitol and bis-p-ethylbenzylidene sorbitol to form a polyolefin resin composition such that the weight ratio of bis-3,4-dimethylbenzylidene sorbitol to bis-p-ethylbenzylidene sorbitol in the polyolefin resin composition is 45:55 to 25:75, prior to processing of the polyolefin resin composition into the polyolefin material.

Preferably, processing of the polyolefin resin composition to form said polyolefin material is conducted at a temperature of from 180° C. to 245° C., preferably from 185° C. to 230° C. Other preferred processing temperature ranges used in the preparation of the polyolefin material include: 200° C. or below, for example from 180° C. to 200° C., more preferably from 185° C. to 198° C., even more preferably at a temperature of from 190° C. to 197° C., most preferably from 190° C. to 195° C.

In an alternative aspect, the present invention also provides a method for forming a polyolefin material; said method comprising: (i) preparing a polyolefin resin composition comprising polyolefin resin, one or more optical brighteners, bis-3,4-dimethylbenzylidene sorbitol and bis-p-ethylbenzylidene sorbitol, wherein the weight ratio of bis-3,4-dimethylbenzylidene sorbitol to bis-p-ethylbenzylidene sorbitol in the polyolefin resin composition is 45:55 to 15:85; (ii) processing said polyolefin resin composition to form said polyolefin material; and wherein processing of the polyolefin resin composition to form said polyolefin material is conducted at a temperature of no more than 200° C.

In this alternative aspect of the invention, a broader weight ratio of bis-3,4-dimethylbenzylidene sorbitol to bis-p-ethylbenzylidene sorbitol (compared with the first aspect) may be utilised and also have advantages over the use of either of bis-3,4-dimethylbenzylidene sorbitol or bis-p-ethylbenzylidene sorbitol alone, when processing of the polyolefin resin composition to form said polyolefin material is conducted at a temperature of no more than 200° C.

Preferably, processing of the polyolefin resin composition to form said polyolefin material is conducted at a temperature of from 180° C. to 200° C., more preferably from 185° C. to 198° C., even more preferably at a temperature of from 190° C. to 197° C., most preferably from 190° C. to 195° C.

Reference herein to a "polyolefin resin composition" is intended to refer to a polyolefin resin in which the combination of one or more optical brighteners, 3,4-DMDBS and EDBS has been dissolved. Thus, the preparation of the polyolefin resin composition in accordance with the present invention may, for instance, comprise dissolving, one or more optical brighteners, 3,4-DMDBS and EDBS in a molten polyolefin resin at the specific weight ratio of 3,4-DMDBS to EDBS as described herein. As will be appreciated, additional clarifying and nucleating agents may be present in the polyolefin resin composition, provided that the weight ratio of 3,4-DMDBS to EDBS in the composition remains as defined herein.

Reference herein to a "polyolefin material" is intended to refer to any thermoplastic article or object which may suitably be prepared from processing a molten polyolefin resin composition as described herein, for instance by extrusion or injection moulding at a processing temperature described hereinabove.

The combination of bis-3,4-dimethylbenzylidene sorbitol and bis-p-ethylbenzylidene sorbitol used in accordance with the present invention has surprisingly been found to exhibit synergistic effects in terms of the solubility in a molten polyolefin resin and in terms of the transparency afforded to a nucleated and clarified polyolefin material obtained therefrom. As a result, the processing temperature over which a nucleated and clarified polyolefin material exhibiting low haze may be effectively prepared is broadened considerably and covers temperatures much lower than those which are feasible with conventional sorbitol based clarifying agents used alone, or combined in known blends. Furthermore, these advantageous effects are not diminished by the presence of one or more optical brighteners which can further enhance the desirable optical properties obtained in the nucleated and clarified polyolefin material, which properties are surprisingly obtainable at low processing temperature.

In particular, blends of bis-3,4-dimethylbenzylidene sorbitol and bis-p-ethylbenzylidene sorbitol in accordance with the present invention consistently exhibit solubility points in molten polyolefin resins which are lower than those of the two sorbitol components individually at the same concentration as that of the total blend concentration. Alternatively or additionally, blends of bis-3,4-dimethylbenzylidene sorbitol and bis-p-ethylbenzylidene sorbitol in accordance with the present invention may confer haze values in a nucleated and clarified polyolefin material prepared therefrom which are lower than those of the two sorbitol components individually at the same concentration as that of the total blend concentration.

Reference herein to "solubility point" is intended to refer to the minimum temperature at which the clarifying/nucleating agents and blends thereof become completely dissolved in a molten polyolefin resin composition, in the absence of any applied shear to the composition. The solubility point (° C.) is defined as the maximum peak in a plot of relative brightness variability versus temperature. Changes in light transmittance in a compounded admixture of resin and clarifying/nucleating agents may be observed as temperature is gradually increased using a microscope (e.g. a BX41, Olympus) with hot stage (e.g. FP90, Mettler) coupled to an image capturing device, such as a microscope digital camera system (e.g. Olympus DP11 or PixeLINK Microscopy Camera), so as to continuously capture images (i.e. photomicrographs/video) of the compounded admixture during heating. Brightness of individual images and brightness variability between successive images may then be determined by means of an analysis unit coupled to the image capturing device. The analysis unit may take the form of a computer system comprising a software package configured for processing the brightness/light transmittance data relating to the captured images (for example, PixeLINK Microscopy Software). From the brightness data, the solubility point may be determined based on the temperature at which maximum relative brightness variability is observed in a plot of relative brightness variability versus temperature.

The change in the physico-chemical properties of the molten composition, for instance in terms of the loss of crystallinity of the blend of nucleators in the molten resin, gives rise to changes in the light transmittance through the molten composition and hence the brightness of the captured images obtained by the camera system. Brightness variability (i.e. change in brightness between successive captured images during heating) reaches a peak upon complete dissolution of the blend of nucleators and corresponds to a maximum in relative brightness variability. Further increases in temperature after complete dissolution have little effect on brightness therefore brightness variability after complete dissolution of the blend of nucleators is minimal between successive captured images. This explains why the dissolution may be visualized as a peak in a plot of relative brightness variability against temperature; the temperature at which the peak in relative brightness variability is observed corresponding to the solubility point.

As will be appreciated, although the solubility point represents the minimum temperature at which all of the clarifying/nucleating agents and blends thereof become completely dissolved in the resin composition, a significant degree of dissolution may be observed at temperatures below the solubility point, particularly in the presence of shear.

Reference herein to "haze value" is intended to refer to the amount of transmitted light that is scattered upon passing through a film or sheet of material. Haze values reported herein were determined following ASTM method D1003-61 ("Standard Test Method for Haze and Luminous Transmittance of Transparent Plastics") and are quoted together with the specific plaque thickness (e.g. 0.5 mm or 1 mm) of the test material, the temperature under which the polyolefin resin is injection moulded (e.g. 180° C., 190° C. or 200° C.), and the total content of clarifying agent in the resin. Haze may be measured using, for instance, a haze meter such as BYK Gardner Haze Guard Plus.

Reference herein to the "temperature at which processing of the resin composition is conducted" or the "processing temperature" is intended to refer to the temperature at which the molten polyolefin composition is processed in order to prepare the polyolefin material. Thus, the processing temperature includes the mould temperature (e.g. injection or extrusion moulding) of the molten polyolefin composition. As will be appreciated, higher temperatures may be employed to ensure dispersion and dissolution of the combination of 3,4-DMDBS and EDBS in the polyolefin resin than are subsequently employed for processing (i.e. moulding) the resulting polyolefin composition, provided that the processing temperature does not preclude the advantageous effects of the combination of 3,4-DMDBS and EDBS. For instance, complete dissolution of 3,4-DMDBS and EDBS in the molten polyolefin resin may be achieved at or above the solubility point of the particular combination of 3,4-DMDBS and EDBS in the resin. However, in at least some embodiments, the processing temperatures used for moulding the polyolefin composition may be lower than the solubility point of the combination of 3,4-DMDBS and EDBS in the resin, without there being plate-out or precipitation of 3,4-DMDBS and EDBS so as to preclude a positive effect on haze properties. It will also be appreciated that satisfactory dispersion and dissolution of the combination of 3,4-DMDBS and EDBS may also be achieved in the resin at temperatures lower than the solubility point of the blend in a particular resin, which as described above is measured in the absence of shear. This is illustrated, for instance, in FIG. 1 (described hereinbelow) which shows that significant dissolution of a clarifying/nucleating agent in a resin composition may be achieved at temperatures which are lower than the measured solubility point.

In accordance with the present invention, a polyolefin resin composition may be prepared by dissolving one or more optical brighteners, 3,4-DMDBS and EDBS at the specific 3,4-DMDBS to EDBS weight ratio described hereinbefore in a molten polyolefin resin. The resulting polyolefin resin composition is thus particularly useful as feedstock for the production of a polyolefin material having desirably low haze, even when said material is produced under lower than conventional processing temperatures (e.g. less than 200° C.).

Thus, in a further aspect, the present invention also provides a nucleating and clarifying additive composition comprising or consisting essentially of one or more optical brighteners, 3,4-DMDBS and EDBS, wherein the weight ratio of 3,4-DMDBS to EDBS in the additive composition is 45:55 to 25:75. Preferably the weight ratio of 3,4-DMDBS to EDBS in the additive composition is 40:60 to 25:75; more preferably wherein the weight ratio of 3,4-DMDBS to EDBS 35:65 to 25:75; most preferably wherein the weight ratio of 3,4-DMDBS to EDBS is 32:68 to 28:72, for example 30:70.

The nucleating and clarifying additive composition of the present invention may further comprise common commercial additives in addition to the one or more optical brighteners, 3,4-DMDBS and EDBS, provided the ratio 3,4-DMDBS to EDBS remains as defined above and provided any additional nucleating and/or clarifying agents do not interfere with the advantageous effects of the combination of 3,4-DMDBS and EDBS.

In yet a further aspect, the present invention also provides a polyolefin resin composition; comprising: (a) polyolefin resin; (b) bis-3,4-dimethylbenzylidene sorbitol; (c) bis-p-ethylbenzylidene sorbitol; and (d) one or more optical brighteners; wherein the weight ratio of bis-3,4-dimethylbenzylidene sorbitol to bis-p-ethylbenzylidene sorbitol in the polyolefin resin composition is from 45:55 to 25:75. Preferably wherein the weight ratio of 3,4-DMDBS to EDBS in the polyolefin resin composition is 40:60 to 25:75; more preferably wherein the weight ratio of 3,4-DMDBS to EDBS 35:65 to 25:75; most preferably wherein the weight ratio of 3,4-DMDBS to EDBS is 32:68 to 28:72, for example 30:70.

In a still further aspect, the present invention provides a polyolefin material comprising: (a) polyolefin; (b) bis-3,4-dimethylbenzylidene sorbitol; (c) bis-p-ethylbenzylidene sorbitol; and (d) one or more optical brighteners; wherein the weight ratio of bis-3,4-dimethylbenzylidene sorbitol to bis-p-ethylbenzylidene sorbitol in the polyolefin material is from 45:55 to 25:75.

Preferably wherein the weight ratio of 3,4-DMDBS to EDBS in the polyolefin material is 40:60 to 25:75; more preferably wherein the weight ratio of 3,4-DMDBS to EDBS 35:65 to 25:75; most preferably wherein the weight ratio of 3,4-DMDBS to EDBS is 32:68 to 28:72, for example 30:70. Preferably, the polyolefin (a) is selected from the group consisting of polypropylene, polyethylene, polybutylene, or blends or copolymers thereof. Most preferably, polyolefin (a) is polypropylene or a copolymer thereof.

In another aspect, the present also provides a polyolefin material prepared by a method as described herein.

The polyolefin resin used in accordance with the present invention refers to any a stereoregular, crystalline resin which may suitably be used for preparing a polyolefin material having low haze. Examples of suitable polyolefin resins include polyethylene resins, polypropylene resins, polybutylene resins, or blends or copolymers thereof. Preferably, the polyolefin resin is selected from polypropylene resins.

There is no specific restriction on the production method, type of stereoregularity, crystallinity, type, components of a blend, or the molecular weight distribution of the polyolefin resins. Examples of the polyethylene resins include high-density polyethylene, medium-density polyethylene, low-density polyethylene, linear low-density polyethylene and ethylene copolymers with an ethylene content of 50 wt. % or more. Examples of polypropylene resins include isotactic or syndiotactic propylene homopolymers and propylene copolymers with a propylene content of 50 wt. % or more. Examples of polybutene resins include isotactic or syndiotactic butene homopolymers and butene copolymers with a butene content of 50 wt. % or more.

The above copolymers may be random copolymers ("RACO"), homo- or block-copolymers. For example, the polyolefin resin may be a polypropylene random compolymer (RACO). Comonomers which can form the above copolymers are, for example, $C_2$-$C_{16}$ alpha-olefins such as ethylene, propylene, butene, pentene, hexene, heptene, octene, nonene, decene, undecene and dodecene; acrylic or methacrylic acid esters, particularly $C_1$-$C_{18}$ alkyl esters, such as methyl acrylate, methyl methacrylate, ethyl acrylate, ethyl methacrylate, butyl acrylate, butyl methacrylate, octyl acrylate, octyl methacrylate, stearyl acrylate, stearyl methacrylate and the like; vinyl acetate; 1,4-endomethylenecyclohexene and like bicyclo monomers.

Catalysts useful for the production of the polymers include not only radical polymerization catalysts and Ziegler-Natta catalysts which are commonly employed in the art, but also catalyst systems comprising a catalyst prepared by depositing a transition metal compound (e.g., titanium halide such as titanium trichloride or titanium tetrachloride) on a support mainly composed of magnesium chloride or like magnesium halide, in combination with an alkyl aluminum compound (such as triethyl aluminum or diethyl aluminum chloride) and; said catalyst systems further comprising a specific ester compound and an organic ether compound; metallocene catalysts comprising a cyclopentadiene or its derivative and a metal of the fourth group such as titanium or zirconium; and said "metallocene catalysts" further comprising methylalumoxane.

The melt flow rate (MFR) of the polyolefin-based resin for use in the invention, measured according to ASTM method D1238-04, may be suitably selected according to the moulding method to be employed and physical properties required of the moulded article. Typically, the MFR for a polyolefin resin suitably varies from 0.01 to 200 g/10 min, preferably from 0.05 to 100 g/10 min. In other preferred embodiments, the MFR value of the polyolefin resin used in accordance with the present invention is 5 g/10 min or above. Polyolefin resins having higher MFRs are more compatible with lower processing temperatures. Thus, in other preferred embodiments, the MFR of the polyolefin resin may be 20 g/10 min or above. In other preferred embodiments, the MFR of the polyolefin resin may be 40 g/10 min or above, for example 50 g/10 min. In other preferred embodiments, the MFR of the polyolefin resin may be 70 g/10 min or above, for example 80 g/10 min. The molecular weight distribution (Mw/Mn) of the resin is not limited, but is usually from 1 to 10.

It is known that polyolefin resins having higher MFR values, i.e. lower viscosities, can typically be processed at lower temperature. Thus, using the combination of 3,4-DMDBS and EDBS in accordance with the present invention, together with polyolefin resins having higher MFR values, for instance 20 g/10 min or above, may be particularly advantageous for preparing a polyolefin material having desirably low haze at lower than conventional processing temperature (e.g. below 200° C.).

The polyolefin resin may be a multimodal, or bimodal or unimodal composition, where modality of the polymer refers to the form of its molecular weight distribution curve (i.e. molecular weight fraction as a function of its molecular weight). For instance, polymer components may be produced in a sequential step process, using reactors arranged in series operating under different reaction conditions. Consequently, each fraction prepared in a specific reactor will have its own molecular weight distribution. When such fractions are combined, it is possible that the molecular weight distribution curve of the final polymer displays multiple maxima, or may be substantially broadened in comparison to the molecular weight distribution curves for the individual fractions.

One or more optical brighteners, also known as fluorescent whitening agents (FWA), are utilized in accordance with the present invention. Optical brighteners are known to absorb ultraviolet light energy and re-emit light by fluorescence mostly in the blue region of the visible spectrum, at a wavelength of approximately 400 to 500 nm. Optical brighteners can be used to reduce the appearance of yellow in materials resulting from a "blue deficit" in the light reflected therefrom.

Any suitable optical brightener may be used in connection with the present invention, such as those which are known for use in improving optical properties of polyolefin materials and having sufficient thermal stability for extrusion or injection moulding processes associated with the preparation of polyolefin materials. Examples of suitable classes of the one or more optical brighteners for use in the present invention include bis-benzoxazoles, phenylcoumarins, methylcoumarins, bis-(styryl)biphenyls, and combinations thereof, which are, for example, described in detail in *Plastics Additives Handbook*, Hanser Gardner Publications, 6th Edition, H. Zweifel, D. Maier, M. Schiller Editors, 2009.

Particularly preferred examples of optical brighteners are selected from the bis-benzoxazole class, namely 2,5-bis(5-tert-butyl-benzoxazol-2-yl)thiophene and 4,4'-bis-benzoxazolyl-stilbene, which are discussed in detail in: *Plastics, Additives and Compounding*, Volume 5, Issue 6, June 2003. 4,4'-bis-benzoxazolyl-stilbene, (CAS #: 1533-45-5), complies with regulations for indirect food additives administered by the U.S. Food and Drug Administration at 21 CFR 178.3297 (Colorants for Polymers). 4,4'-bis-benzoxazolyl-stilbene is also listed in European Union Directive 2002/72/EC as PM/Ref. No. 38515 for use in plastics for indirect food contact. 2,5-bis(5-tert-butyl-benzoxazol-2-yl)thiophene (CAS #: 7128-64-5): is listed in European Union Directive 2002/72/EC as PM/Ref No. 38560 for use in plastics for indirect food contact.

Specific examples of commercially available bis-benzoxazole optical brighteners include: Tinopal® family from BASF, which such as Tinopal ABP-A, Tinopal ABP-X, Tinopal ASP, Tinopal BPO, TinopalEC, Tinopal HST, Tinopal HW, Tinopal MSP, Tinopal NP, Tinopal SPP-N, Tinopal SPP-Z, Tinopal UP HC DD, Tinopal UP, Tinopal CBS-X and Tinopal® OB; UVITEX® compounds from Ciba Specialty Chemicals, such as UVITEX® OB, UVITEX® OB-C, UVITEX® OB-P, UVITEX® FP, UVITEX® FP-C; Eastobrite® compounds from Eastman Chemical, such as Eastobrite® OB, Eastobrite® OB-1 and Eastobrite® OB-3, Hostalux® compounds from Clariant, such as Hostalux ACK, Hostalux CP01, Hostalux EBU, Hostalux EF, Hostalux ERE, Hostalux EREN, Hostalux ES2R, Hostalux ESR, Hostalux ETB 300, Hostalux ETBN, Hostalux KCB, Hostalux KS, Hostalux KS1 B, Hostalux KSB3, Hostalux KSC, Hostalux KSN, Hostalux NR, Hostalux NSM, Hostalux PFC, Hostalux PFCB, Hostalux PN, Hostalux PNB, and Hostalux PR, Whitefluor® compounds (bis-(styryl)-benzoxazoles) from Sumitomo Chemical Co., such as Whitefluor® B, Whitefluor® PEN, Whitefluor® PHR, Whitefluor® HCS, Whitefluor® PCS.

Specific examples of phenylcoumarins and methylcoumarins include 3-phenyl-7-(4-methyl-6-butyloxybenzoxazole)coumarin and 4-methyl-7-diethylamincoumarin, respectively.

Specific examples of commercially available methylcoumarin optical brighteners are Eccowhite® compounds from Eastern Color & Chemical Co., such as Eccowhite 1 132 MOD, Eccowhite 2013, Eccowhite 2790, Eccowhite 5261, Eccowhite AEA-HF, Eccowhite Nylon FW, Eccowhite OP, Eccowhite PSO, Eccowhite DM-04 MOD.

The nucleating and clarifying additive composition of the present invention typically comprises an amount of one or more optical brighteners at a level which leads to an improvement in optical properties (for instance, a yellowness reduction) in the polyolefin material prepared therefrom. Preferably, a minimum amount of the one or more optical brighteners is used which is sufficient for achieving the desired benefit to optical properties of the polyolefin material made therefrom.

The amount of optical brightener in the nucleating and clarifying additive composition is preferably in an amount necessary to give a concentration of the optical brightener in the nucleated and clarified polyolefin material prepared therefrom of from 1 to 100 ppm, more preferably from 2 to 50 ppm, and even more preferably from 5 to 20 ppm. In other preferred embodiments, the total amount of the one or more optical brighteners present in the nucleating and clarifying additive composition is from 0.05 to 5.0 wt. %, based on the combined weight of bis-3,4-dimethylbenzylidene sorbitol and bis-p-ethylbenzylidene present, more preferably from 0.1 to 3.0 wt %, even more preferably from 0.50 to 2.0 wt %. The total amount of the one or more optical brighteners in the polyolefin resin composition according to the present invention is preferably from 1 to 100 ppm, by weight of the polyolefin resin composition, more preferably from 2 to 50 ppm, and even more preferably from 5 to 20 ppm, by weight of the polyolefin resin composition.

The polyolefin resin for use in the present invention may contain, where necessary, rubbers, for the purpose of improving the low-temperature properties and impact resistance of the resin. For instance, the polyolefin resin may contain ethylene-propylene rubbers, SBR, hydrogenated SBR, SBS block copolymers, hydrogenated SBS block copolymers, hydrogenated styrene-isoprene (S-I) block copolymers or hydrogenated S-I-S block copolymers.

Furthermore, where necessary, rigidity-imparting nucleating agents or fillers can also be added to the polyolefin resin in an amount which does not compromise the effects of the present invention (e.g., up to about 50 wt. parts, in particular about 0.01 to 20 wt. parts, per 100 wt. parts of the polyolefin resin). For instance, talc, hydrotalcite, mica, zeolite, perlite, diatomaceous earth, calcium carbonate and aluminum hydroxy-bis-tert-butylbenzoate may be added to the polyolefin resin.

Where necessary, the polyolefin resin for use in the invention may contain pigments. Various pigments including white pigments are usable, but colour pigments are preferred. Examples of useful pigments include titanium oxide pigments (for instance, titanium dioxide, titanium yellow and titanium black), zinc oxide, chromium oxide, zinc sulfide, carbon black, iron oxide pigments (for instance, iron oxide, yellow oxide, red oxide), cadmium sulfide pigments (for instance, cadmium yellow, and cadmium mercury red), barium sulfate, ultramarine, cobalt blue, phthalocyanine pigments (for instance, phthalocyanine green, and phthalocyanine blue), isoindolinone pigments (for instance, isoindolinone yellow, and isoindolinone red), azo pigments (for instance, permanent red FSR, and pigment scarlet 3B), quinacridon pigments, anthrapyrimidine pigments (for instance, anthrapyrimidine yellow), benzidine pigments (for instance, benzidine orange GR), indanthrene pigments (for instance, indanthrene brilliant orange) and manganese violet. Pigment may be used in an amount that does not compromise the effects of the invention. Typically, it is used in an amount of from 1 to 500 ppm of the polyolefin resin composition.

The polyolefin resin for use in the present invention may contain other additives such as stabilizers, neutralizing agents, antistatic agents, and lubricants. These known additives may be used in combination, insofar as they do not compromise the effects of the invention.

3,4-DMDBS and EDBS, used in accordance with the present invention, are readily available from commercial sources as powders, or they can be made by methods familiar to the skilled person. For instance, 3,4-DMDBS and EDBS may be prepared by the methods described in U.S. Pat. Nos. 4,429,140 or 4,902,807 (assigned to New Japan Chemical Co., Ltd), which methods involve the reaction of sorbitol with a substituted benzaldehyde or alkyl acetal derivative thereof. Suitable commercial 3,4-DMDBS products include Geniset® DXR from New Japan Chemical Co., Ltd and Millad® 3988 from Miliken Chemical.

Any suitable means for admixing the one or more optical brighteners, 3,4-DMDBS, EDBS and polyolefin resin of which the skilled person is aware may be used for forming the polylef in composition. The method for addition of the one or more optical brighteners, 3,4-DMDBS and EDBS to the polyolefin resin in order to form the polyolefin resin composition according to the invention is thus not specifically limited, although it is preferable to use a single-stage addition method wherein the one or more optical brighteners and nucleating and clarifying agents are added to the resin directly, at the required ratio. However, a two-stage addition method can also be employed, wherein the nucleating and clarifying agents are added in the form of a masterbatch having a concentration of about 2 to about 15% by weight, provided the batch contains the agents in the required ratio. Dissolution of the one or more optical brighteners, 3,4-DMDBS and EDBS in a polyolefin resin composition may be enhanced by increasing the levels of shear during resin processing. For instance, use of a twin screw extruder in favour of a single screw extruder when compounding is known generally to encourage dissolution.

In a number of aspects of the invention described herein, the weight ratio of 3,4-DMDBS to EDBS which is used is 45:55 to 25:75. Preferably, the weight ratio of 3,4-DMDBS to EDBS is 40:60 to 25:75, more preferably 35:65 to 25:75, most preferably 32:68 to 28:72, for example 30:70. The synergistic effects of the blends are achievable with these weight ratios of 3,4-DMDBS to EDBS. Synergistic effects are also noticeable across a broader range of weight ratios, in particular where the weight ratio of 3,4-DMDBS to EDBS which is used is from 45:55 to 15:85, when processing of the polyolefin resin composition to form said polyolefin material is conducted at a temperature of no more than 200° C.

In particular, these blends exhibit a surprising synergy giving rise to particularly low solubility points, which mean that lower temperatures can be used to dissolve the nucleating and clarifying agents in the molten polyolefin resin in order to form the polyolefin resin composition. Moreover, lower processing temperatures can be used when the polyolefin resin composition is processed (e.g. moulded) to form the nucleated and clarified polyolefin material in accordance with the invention. Polyolefin materials prepared at lower than conventional processing temperatures, for instance lower than 200° C., have also been found to exhibit haze values which are lower than if either of 3,4-DMDBS and EDBS of the blends was used alone. These effects are clearly of particular advantage for broadening the range of temperature over which a low haze polyolefin material may suitably be prepared, as well as for preparing desirable polyolefin materials with reduced energy consumption. Furthermore, the high level of shear developed when admixing 3,4-DMDBS, EDBS and the polyolefin resin and subsequently processing the composition enhances dissolution of 3,4-DMDBS and EDBS. Consequently, adequate levels of dissolution may thus be achieved in the resin composition at processing temperatures which are even lower than the solubility points of the blend of 3,4-DMDBS and EDBS used in accordance with the invention. Furthermore, these advantageous effects are not diminished by the presence of the one or more optical brighteners which can further enhance the desirable optical properties obtained in the nucleated and clarified polyolefin material, which properties are surprisingly obtainable at low processing temperature.

If lower moulding temperatures are used, then the time lag before the polyolefin material is removed from the mould (i.e. the cooling period for reaching the relevant crystallisation point of the polyolefin resin composition) may be reduced. This can shorten cycle times and increase process efficiency.

At low processing temperatures (e.g. below 200° C.), EDBS alone as a clarifying and nucleating agent may exhibit good solubility in the molten polyolefin resin, whilst also conferring a satisfactory level of transparency to the polyolefin material prepared therefrom. Moreover, blends of 3,4-DMDBS and EDBS comprising less than, for example, 50 wt. % EDBS have been found to have unsatisfactory dissolution in polyolefin resins such as polypropylene resin. However, EDBS, when used alone or in a blend with 3,4-DMDBS comprising greater than 80 wt. % of EDBS, has been found to confer unsatisfactory organoleptic properties on the nucleated and clarified polyolefin material. In particular, use of EDBS in such amounts leads to a sweet odour associated with the polyolefin material obtained therefrom. This is believed to be associated with the decomposition of EDBS during processing, leading to formation of the ethyl substituted benzaldehyde component, which has a sweet odour.

A further advantage of using the above described blends of 3,4-DMDBS and EDBS is that the polyolefin material clarified and nucleated with these agents at the weight ratio according to the invention possess desirable organoleptic properties, having no odour normally associated with the use of EDBS.

Nevertheless, blends of EDBS and 3,4-DMDBS where the concentration of EDBS in the blend is as high as 85 wt. % can still confer benefits, provided the resin composition is processed at temperatures of no more than 200° C. In particular, it has been found to be possible to prepare nucleated and clarified polyolefin material from a polyolefin resin composition comprising bis-3,4-dimethylbenzylidene sorbitol and bis-p-ethylbenzylidene sorbitol in a weight ratio of from 45:55 to 15:85 (as in the alternative aspect of the present invention) using temperatures of 200° C. or lower without the polyolefin material suffering from unsatisfactory organoleptic properties, which would otherwise result from the use of EDBS alone.

The concentration of 3,4-DMDBS and EDBS used in the polyolefin resin composition is not specifically limited and can be suitably determined over a wide range insofar as the contemplated effects are attainable. Suitably, the total concentration of 3,4-DMDBS and EDBS in the polyolefin resin composition is from 1000 ppm to 5000 ppm, by weight of the polyolefin resin composition. In some embodiments, the total concentration of 3,4-DMDBS and EDBS in the polyolefin resin composition is from 1500 ppm to 4000 ppm, by weight of the polyolefin resin composition. In some embodiments, the total concentration of 3,4-DMDBS and EDBS in the polyolefin resin composition is from 2250 ppm to 3250 ppm, by weight of the polyolefin resin composition, for example 2500 ppm or 3000 ppm. In some embodiments, the total concentration of 3,4-DMDBS and EDBS in the polyolefin resin composition is from 1500 ppm to 2500 ppm, by weight of the polyolefin resin composition; preferably from 1750 ppm to 2250 ppm, by weight of the polyolefin resin composition; more preferably from 1900 ppm to 2100 ppm, by weight of the polyolefin resin composition, for example 2000 ppm.

Where reference is made herein to processing the polyolefin resin composition in order to form the clarified and nucleated polyolefin material, this may be by any suitable means of which the skilled person is aware. Suitably, any of the conventional moulding methods can be employed to mould the resin composition of the invention. Illustrative of such moulding methods are injection moulding, injection stretch moulding, extrusion moulding, blow moulding, vacuum moulding, rotational moulding and film moulding.

Thus, for example, the polyolefin resin composition may first be prepared by blending the crystalline resin directly with the one or more optical brighteners and nucleating and clarifying agents of the invention in the specific ratio, before the resulting mixture is moulded into the desired product. Alternatively, the one or more optical brighteners and the nucleating and clarifying agents may be incorporated into the resin before pelletizing the mixture, and thereafter moulding the same into the polyolefin material.

The weight ratio of 3,4-DMDBS to EDBS in the resulting polyolefin material formed after processing of the polyolefin resin composition may suitably be verified by $^1$H NMR analysis.

It has been found that the effects of the present invention may be enhanced if the blend of 3,4-DMDBS and EDBS, as well as the one or more optical brighteners, is melt compounded with the polyolefin resin and extruded before the resulting polyolefin resin composition is processed to form the polyolefin material. In particular, it has surprisingly been found that a greater reduction in haze values is exhibited by melt compounding and extruding the resin composition prior to moulding to prepare the polyolefin material in comparison to simply mixing the components of the resin composition and moulding only. These effects are illustrated by the examples provided hereinbelow.

Thus, in preferred embodiments, the methods of the present invention include a step of melt compounding and extruding the components of the polyolefin resin composition prior to processing to form the polyolefin material. In particularly preferred embodiments, the methods of the present invention include a step of melt compounding and extruding the components of the polyolefin resin composition before the resulting polyolefin resin composition is injection moulded to form the polyolefin material.

Preferably, the polyolefin material which may be prepared in accordance with the present invention has a haze value, as measured in accordance with ASTM D1003-61 for a 2 mm thick plaque, of below 45%, more preferably below 42%, still more preferably below 40%, most preferably below 38%, for example 37%, or 36%. Preferably, these levels of haze are obtained by processing the polyolefin resin composition at temperatures below 200° C., for example from 185° C. to 198° C., more preferably at a temperature of from 190° C. to 197° C., most preferably from 190° C. to 195° C.

Preferably, the polyolefin material which may be prepared in accordance with the present invention has a haze value, as measured in accordance with ASTM D1003-61 for a 1 mm thick plaque, of below 20%, more preferably below 15%, still more preferably below 13%, most preferably below 12%, for example 11%, or 10%. Preferably, these levels of haze are obtained by processing the polyolefin resin composition at temperatures below 200° C., for example from 180° C. to 200° C., preferably from 185° C. to 198° C., even more preferably at a temperature of from 190° C. to 197° C., most preferably from 190° C. to 195° C.

Preferably, the polyolefin material which may be prepared in accordance with the present invention has a haze value, as measured in accordance with ASTM D1003-61 for a 0.5 mm thick plaque, of below 15%, more preferably below 10%, still more preferably below 8%, most preferably below 6%, for example 5%, or 4%. Preferably, these levels of haze are obtained by processing the polyolefin resin composition at temperatures below 200° C., for example from 180° C. to 200° C., preferably from 185° C. to 198° C., even more preferably at a temperature of from 190° C. to 197° C., most preferably from 190° C. to 195° C.

Preferably, the polyolefin material which may be prepared in accordance with the present invention has a Yellowness Index (YI), as measured in accordance with ASTM E313 for a 2 mm thick plaque, of less than 7.5, more preferably less than 5, even more preferably less than 2.5, most preferably less than 0.5. Preferably, these levels of Yellowness Index are obtained by processing the polyolefin resin composition at temperatures below 200° C., for example from 180° C. to 200° C., preferably from 185° C. to 198° C., even more preferably at a temperature of from 190° C. to 197° C., most preferably from 190° C. to 195° C.

In still a further aspect, the present invention provides a polyolefin material prepared from a polyolefin resin comprising one or more optical brighteners and having a melt flow rate of least 40 g/10 min, as measured in accordance with ASTM method D1238-04, which when moulded, preferably injection moulded, at 180° C. has a haze value of less than 20%, as measured in accordance with ASTM D1003-61 for a plaque of 1 mm thickness and a and a Yellowness Index of less than 2.5, as measured in accordance with ASTM E313 for a 2 mm thick plaque. Prior to the method of the present invention, it is believed not to have been possible to produce a polyolefin material having such a low haze and low Yellowness Index from a polyolefin resin composition having a relatively high melt flow rate (i.e. at least 40 g/10 min) at a moulding temperature of 180° C.

Preferably, the polyolefin resin has a melt flow rate of less than 500 g/10 min, as measured in accordance with ASTM method D1238-04, preferably less than 200 g/10 min, more preferably less than 150 g/10 min.

In yet a further aspect, the present invention also provides the use of a combination of one or more optical brighteners, bis-3,4-dimethylbenzylidene sorbitol and bis-p-ethylbenzylidene sorbitol in a bis-3,4-dimethylbenzylidene sorbitol to bis-p-ethylbenzylidene sorbitol weight ratio of 45:55 to 25:75 in the preparation of a nucleated and/or clarified polyolefin material, for broadening the processing temperature over which a nucleated and/or clarified polyolefin material may be prepared in comparison with the preparation of a nucleated and/or clarified polyolefin material using bis-3,4-dimethylbenzylidene sorbitol or bis-p-ethylbenzylidene sorbitol as the sole clarifying and/or nucleating agent; wherein the haze value of the nucleated and/or clarified polyolefin material is less than 20%, as measured in accordance with ASTM D1003-61 for a plaque of 1 mm thickness, and the Yellowness Index of the nucleated and/or clarified polyolefin material is less than 2.5, as measured in accordance with ASTM E313 for a 2 mm thick plaque.

In yet another aspect, the present invention provides the use of a combination of one or more optical brighteners, bis-3,4-dimethylbenzylidene sorbitol and bis-p-ethylbenzylidene sorbitol in the preparation of a nucleated and/or clarified polyolefin material at processing temperatures of 200° C. or below.

In yet another aspect, the present invention provides the use of a combination of one or more optical brighteners, bis-3,4-dimethylbenzylidene sorbitol and bis-p-ethylbenzylidene sorbitol in the preparation of a nucleated and/or clarified polyolefin material having a haze value of less than 20%, measured in accordance with ASTM D1003-61 for a plaque of 1 mm thickness, and having a Yellowness Index of less than 2.5, as measured in accordance with ASTM E313 for a 2 mm thick plaque, at processing temperatures of 200° C. or below.

Figure 2:
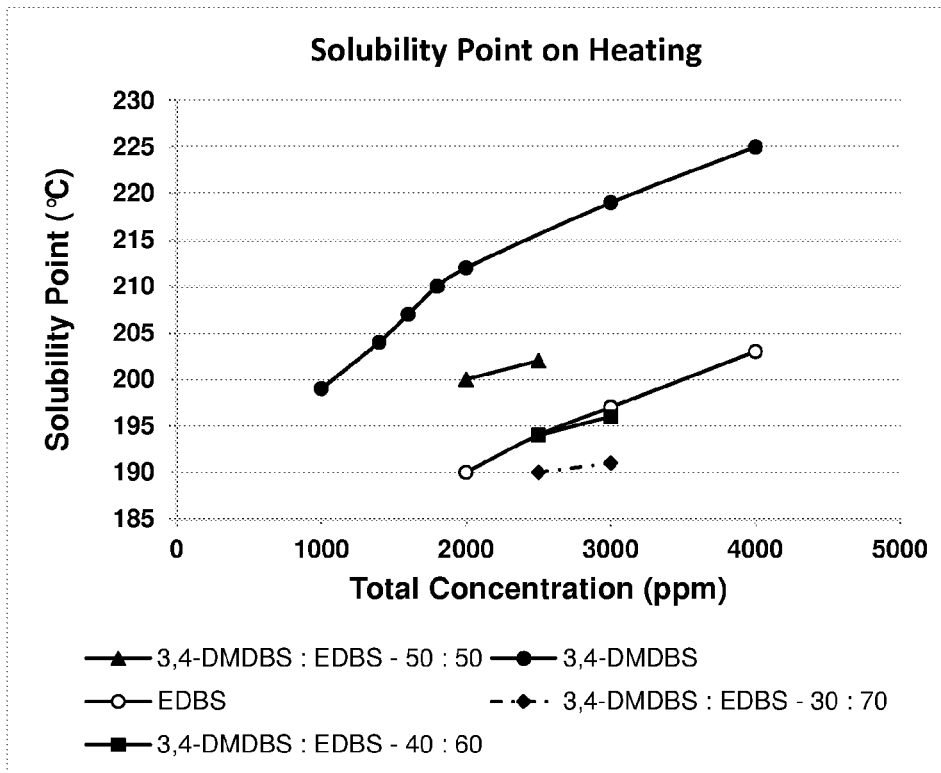
Figure 3:
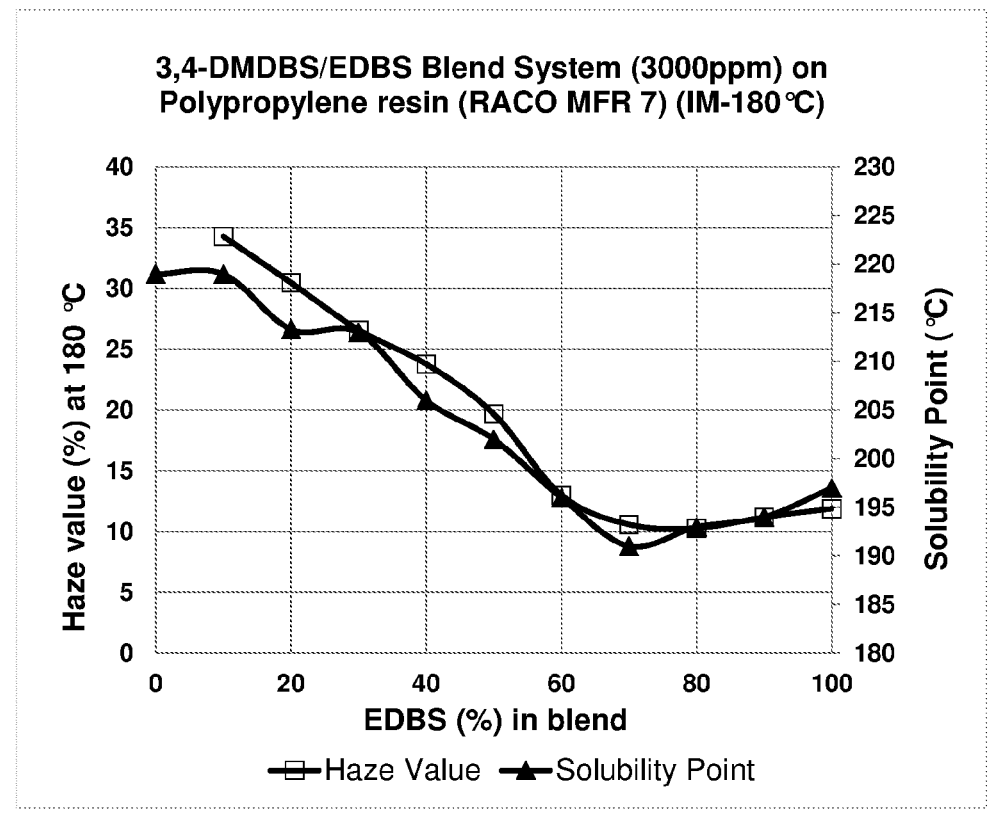
Figure 4:
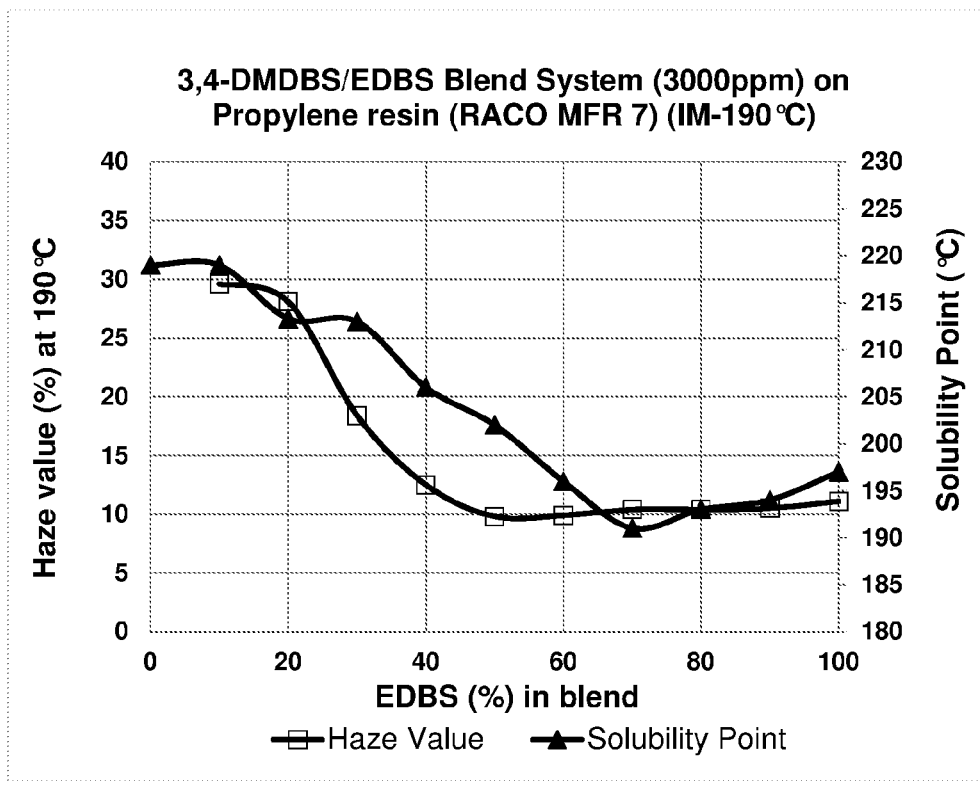
Figure 5:
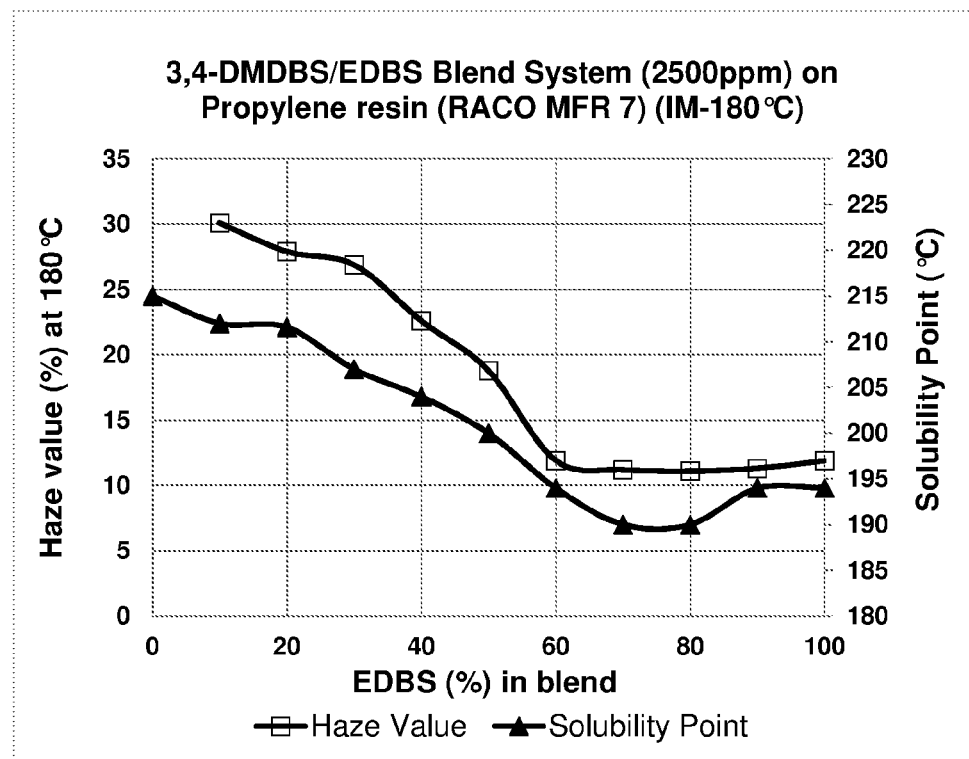
Figure 6:
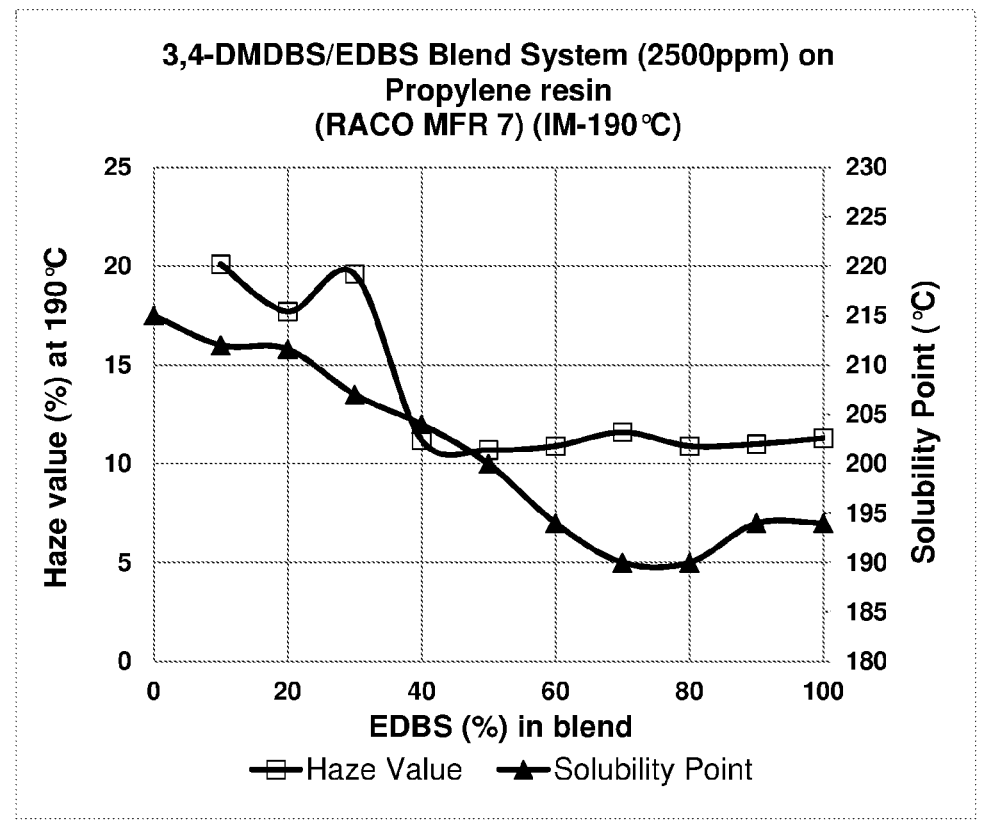
Figure 7:
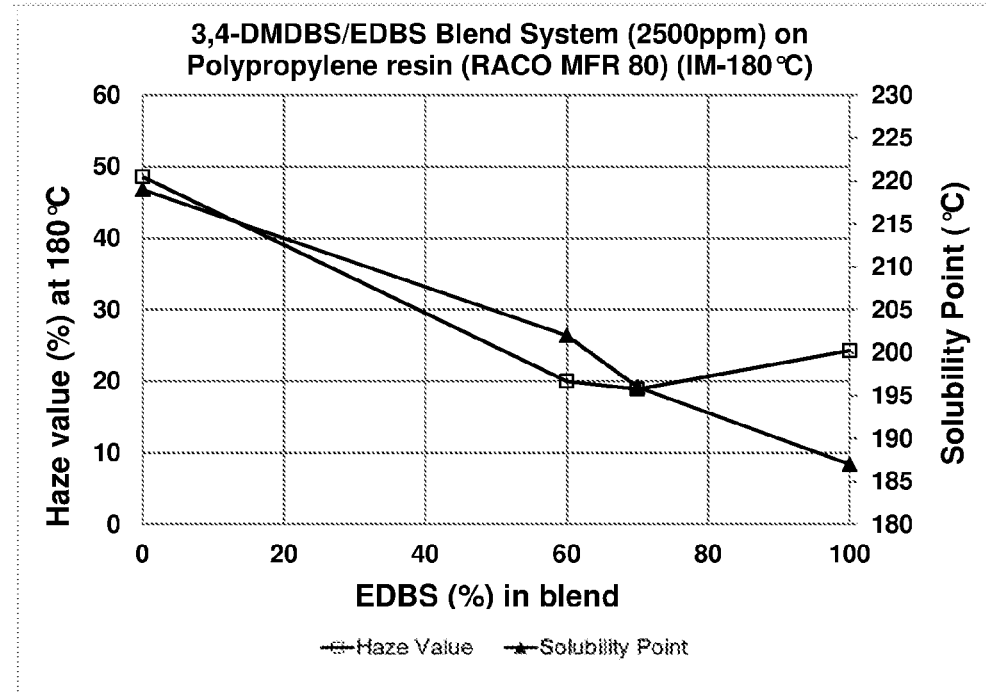
Figure 8:
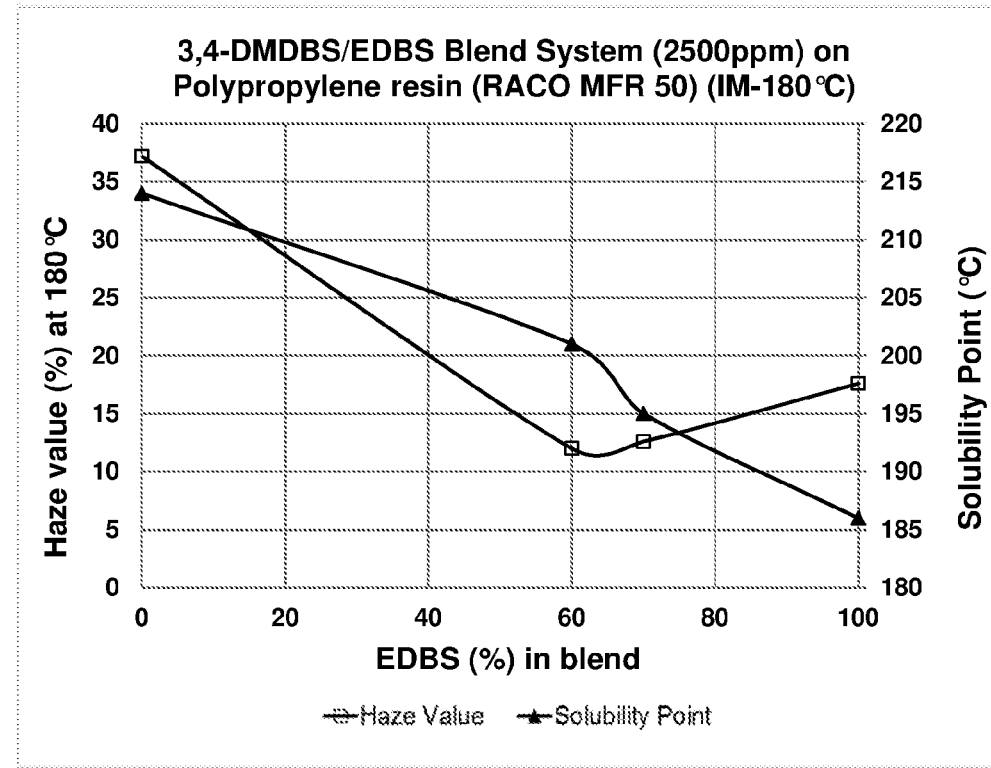
Figure 9:
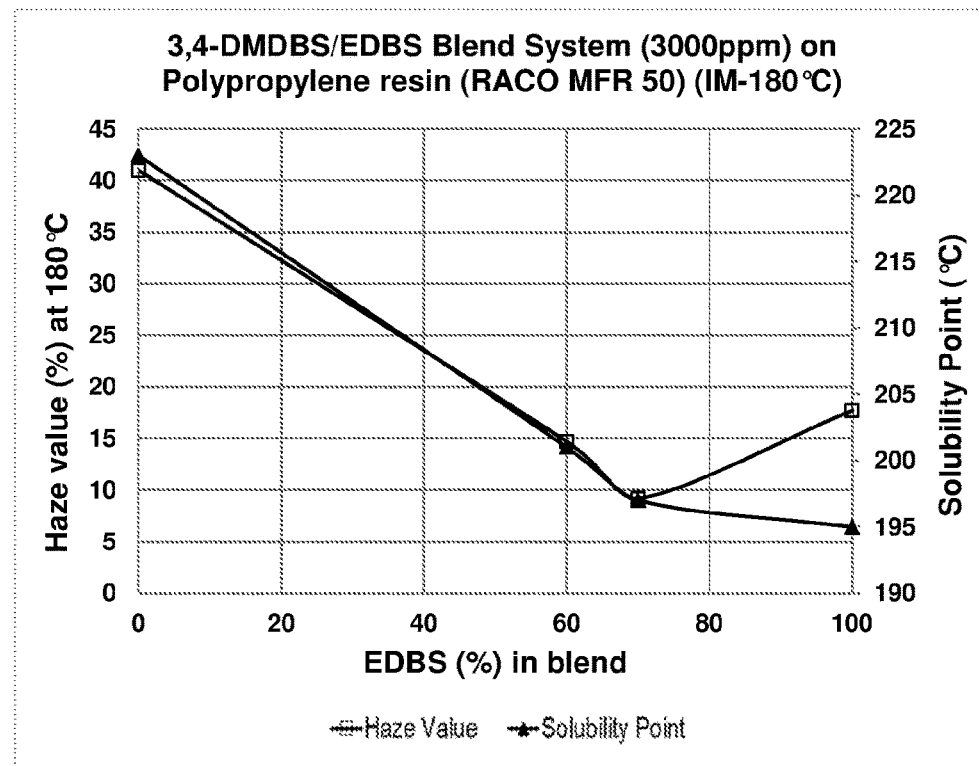
Figure 10:
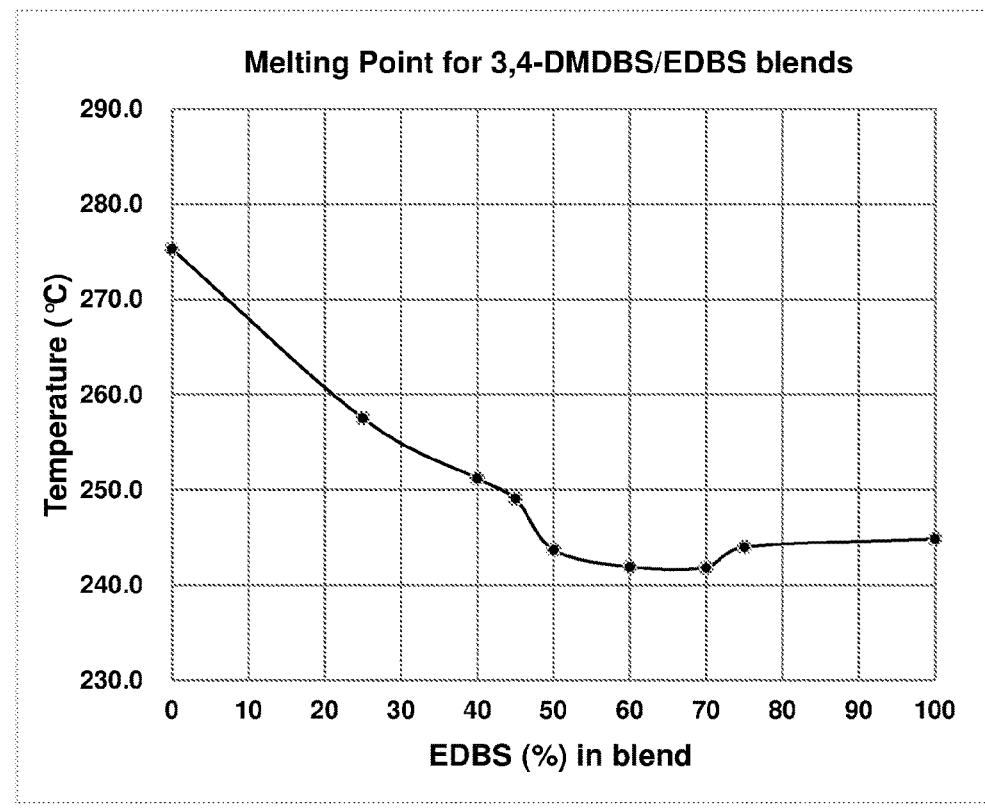

The present invention will now be illustrated by way of the following examples and with reference to the following figures:

FIG. 1: Graphical representation for solubility point (° C.) determination from the maximum value for relative brightness variability for different concentrations of 3,4-DMDBS in a molten propylene random copolymer resin (MFR 7 g/10 min);

FIG. 2: Graphical representation of the solubility point (° C.) for different concentrations of 3,4-DMDBS, EDBS and blends thereof in a molten propylene random copolymer resin (MFR 7 g/10 min);

FIG. 3: Graphical representation of solubility point (° C.) for various blends of 3,4-DMDBS and EDBS in molten propylene random copolymer resin (MFR 7 g/10 min), at a combined concentration of 3000 ppm, based on the total weight of the resin composition, as well as haze values for a polyolefin material prepared by injection moulding the corresponding resin composition at 180° C. ("IM-180° C.");

FIG. 4: Graphical representation of solubility point (° C.) for various blends of 3,4-DMDBS and EDBS in molten propylene random copolymer resin (MFR 7 g/10 min), at a combined concentration of 3000 ppm, based on the total weight of the resin composition, as well as haze values for a polyolefin material prepared by injection moulding the corresponding resin composition at 190° C. ("IM-190° C.");

FIG. 5: Graphical representation of solubility point (° C.) for various blends of 3,4-DMDBS and EDBS in molten propylene random copolymer resin (MFR 7 g/10 min), at a combined concentration of 2500 ppm, based on the total weight of the resin composition, as well as haze values for a polyolefin material prepared by injection moulding the corresponding resin composition at 180° C. ("IM-180° C.");

FIG. 6: Graphical representation of solubility point (° C.) for various blends of 3,4-DMDBS and EDBS in molten propylene random copolymer resin (MFR 7 g/10 min), at a combined concentration of 2500 ppm, based on the total weight of the resin composition, as well as haze values for a polyolefin material prepared by injection moulding the corresponding resin composition at 190° C. ("IM-190° C.");

FIG. 7: Graphical representation of solubility point (° C.) for various blends of 3,4-DMDBS and EDBS in molten propylene random copolymer resin (MFR 80 g/10 min), at a combined concentration of 2500 ppm, based on the total weight of the resin composition, as well as haze values for a polyolefin material prepared by injection moulding the corresponding resin composition at 180° C. ("IM-180° C.");

FIG. 8: Graphical representation of solubility point (° C.) for various blends of 3,4-DMDBS and EDBS in molten propylene random copolymer resin (MFR 50 g/10 min), at a combined concentration of 2500 ppm, based on the total weight of the resin composition, as well as haze values for a polyolefin material prepared by injection moulding the corresponding resin composition at 180° C. ("IM-180° C.");

FIG. 9: Graphical representation of solubility point (° C.) for various blends of 3,4-DMDBS and EDBS which also comprise in molten propylene random copolymer resin (MFR 50 g/10 min), at a combined concentration of 3000 ppm, based on the total weight of the resin composition, as well as haze values for a polyolefin material prepared by injection moulding the corresponding resin composition at 180° C. ("IM-180° C."); and FIG. 10: Graphical representation of melting points for 3,4-DMDBS, EDBS and blends thereof.

EXAMPLES

Solubility Point

The solubility point (° C.) was measured using compounded pelletized samples of base resin (described in further detail below). The particular compounded pellets were melt compounded at 190° C., thereby avoiding complete dissolution of the clarifier/nucleating agent. The clarifier/nucleating agent containing pellets were melted above the polyolefin's softening point (>160° C.) at a rate of 10° C./min up to 230° C. As the temperature increased, the clarifier/nucleating agent dispersion eventually dissolved completely into the molten resin and the temperature was recorded following completion of the phase change. Molten pellets were observed using a microscope (BX41, Olympus) with hot stage (FP90, Mettler) and microscope digital camera system (PixeLINK Microscopy Camera).

Changes in light transmittance/brightness were recorded by a camera system and analysed by means of a computer software program (PixeLINK Microscopy Software—Capture Standard Edition). From the light transmittance/brightness data, the solubility point was determined based on the temperature at which maximum relative brightness variability was observed in a plot of relative brightness variability versus temperature.

FIG. 1 corresponds to the plot observed when determining the solubility point of different concentrations (1000, 2000, 3000 and 4000 ppm) of 3,4-DMDBS in molten polypropylene "RACO" MFR 7 g/10 min. Maximum values for relative brightness variability and corresponding temperature (solubility point) are shown to increase as the concentration of 3,4-DMDBS in the molten resin composition is increased. FIG. 1 illustrates, by virtue of the changing relative brightness variability, that significant dissolution of the clarifier/nucleating agent in the resin composition is observed at temperatures below the measured solubility point.

Haze Value

The haze value of the polyolefin material formed was measured according to ASTM Standard Test Method D1003-61 "Standard Test Method for Haze and Luminous Transmittance of Transparent Plastics" using a Gardner Hazegard Plus.

General Procedure for Preparation of Polyolefin Material

The base resin (random copolymer, hereinafter "RACO") and all additives were weighed and then blended in a Super mixer for 2 minutes at 1500 rpm. All samples were then melt compounded on a twin screw extruder at a ramped temperature from about 170° C. to 185° C. The melt temperature upon exit of the extruder die was about 190° C. Pelletized samples were subsequently used for solubility point measurements. Plaques of the target polyolefin material were then made on 25 ton injection moulder using the pelletized samples. The moulder barrel was set at the specific temperature indicated below. Plaques were prepared having dimensions of 75 mm×75 mm×Z mm, where thickness, Z, is 0.5. mm, 1 mm or 2 mm, using a mirror-polished mould. Cooling circulating water in the mould was controlled at a temperature of 20° C. Once prepared, the plaques were rested for 24 hours at room temperature before being analysed to determine their respective Haze values.

The polyolefin base resin used in the present examples was a polypropylene of the following composition:

| | |
|---|---|
| Polypropylene random copolymer powder | 1000 g |
| Irganox ® 1010, Primary Antioxidant (from BASF) | 500 ppm |
| Irgafos ® 168, Secondary Antioxidant (from BASF) | 500 ppm |
| Calcium Stearate, Acid Scavenger | 500 ppm |
| Clarifying compounds or compositions | (as indicated below) |

Mixtures of 3,4-DMDBS and EDBS were prepared by admixing the two components in powder form at the desired ratio, before being blended with the base resin as described above.

3,4-DMDBS was obtained from New Japan Chemical (Geniset® DXR). EDBS was prepared in accordance with the following method. A 5 L reaction kettle, equipped with a stirrer and nitrogen inlet, was charged with 400 g of sorbitol in 2400 g of methanol. 416 g of ethylbenzaldehyde and a catalyst methanol solution (6 g of p-toluenesulfonic acid in 100 g of methanol) were added to the reaction vessel. The solution was stirred at 50° C. for 24 hours, during which time a white precipitate formed, which was isolated by filtration and washed with methanol to give a white powder. The powder was suspended at pH 8 with a small amount of KOH, and the suspension heated to boiling point, then filtered. The white powder obtained was washed with boiling water and further neutralized to pH 7. The suspension was heated to boiling point before being filtered. The precipitated white powder obtained was rinsed with methanol before a further filtration afforded a white solid. The isolated white powder was dried in a vacuum oven at 80° C. to give 370 g of EDBS product having a purity above 99% (58 yield).

Example 1

The solubility points of 3,4-DMDBS and EDBS at different concentrations in molten polypropylene "RACO" MFR 7 g/10 min were determined and the results are provided below in Table 1.

TABLE 1

| 3,4-DMDBS (ppm) | EDBS (ppm) | 3,4-DMDBS:EDBS ratio | Solubility Point (° C.) |
|---|---|---|---|
| 1000 | 0 | 100:0 | 199 |
| 1400 | 0 | 100:0 | 204 |
| 1600 | 0 | 100:0 | 207 |
| 1800 | 0 | 100:0 | 210 |
| 2000 | 0 | 100:0 | 212 |
| 3000 | 0 | 100:0 | 219 |
| 4000 | 0 | 100:0 | 225 |
| 0 | 2000 | 0:100 | 190 |
| 0 | 2500 | 0:100 | 194 |
| 0 | 3000 | 0:100 | 197 |
| 0 | 4000 | 0:100 | 203 |
| 750 | 1750 | 30:70 | 190 |
| 1000 | 1500 | 40:60 | 194 |
| 1250 | 1250 | 50:50 | 200 |
| 900 | 2100 | 30:70 | 191 |
| 1200 | 1800 | 40:60 | 196 |
| 1500 | 1500 | 50:50 | 202 |

The results in Table 1 show that EDBS is highly soluble in molten polypropylene, even at high concentrations (e.g. 4000 ppm), having a solubility point significantly lower than that of 3,4-DMDBS at equivalent concentrations. However, EDBS alone has less favourable organoleptic properties, as described above. Furthermore, blends of 3,4-DMDBS and EDBS at a weight ratio in accordance with the invention have lower solubility points than 3,4-DMDBS and even EDBS, when used alone at the same concentration as the total blend concentration and in the same polyolefin resin.

For example, at a concentration of 3000 ppm, the solubility point of 3,4-DMDBS in the polypropylene random copolymer resin was observed to be 219° C. and, at a concentration of 3000 ppm, the solubility point of EDBS in the same polypropylene random copolymer resin was observed to be 197° C. In contrast, a blend of 3,4-DMDBS and EDBS in a ratio according to the invention (30:70) at a combined concentration of 3000 ppm (900 ppm+2100 ppm) in the same polypropylene random copolymer resin was observed to be 191° C. Notably, a blend of 3,4-DMDBS and EDBS at a weight ratio not in accordance with the invention (50:50) at a combined concentration of 3000 ppm (1500 ppm+1500 ppm) in the same polypropylene random copolymer resin was observed to be 202° C., significantly higher than the solubility point of EDBS at a concentration of 3000 ppm in the same polypropylene random copolymer resin.

A selection of the above results is also represented graphically in FIG. 2, from which the synergistic effects of the blend of 3,4-DMDBS and EDBS at a weight ratio according to the invention can be seen.

Example 2

The solubility points of 3,4-DMDBS, EDBS and blends thereof at different concentrations in molten polypropylene "RACO" MFR 7 g/10 min were determined followed by determination of haze values for polypropylene materials prepared therefrom in accordance with the general procedure described above. The results are provided in Table 2 below.

TABLE 2

| 3,4-DMDBS (ppm) | EDBS (ppm) | 3,4-DMDBS:EDBS ratio | Solubility Point (° C.) | Haze (ASTM-D1003-61—1 mm) | | |
|---|---|---|---|---|---|---|
| | | | | IM-180° C. | IM-190° C. | IM-200° C. |
| 2000 | 0 | 100:0 | 212 | 28.9 | 17.2 | 10.6 |
| 0 | 1500 | 0:100 | — | 12.9 | 12.8 | 13.2 |
| 0 | 2000 | 0:100 | 190 | 11.6 | 11.8 | 12.4 |
| 0 | 2500 | 0:100 | 194 | 11.9 | 11.3 | 12.0 |
| 0 | 3000 | 0:100 | 197 | 11.9 | 11.1 | 11.5 |
| 250 | 2250 | 10:90 | 194 | 11.3 | 11.0 | 11.3 |
| 500 | 2000 | 20:80 | 194 | 11.1 | 10.9 | — |
| 750 | 1750 | 30:70 | 190 | 11.2 | 11.6 | 12.0 |
| 1000 | 1500 | 40:60 | 194 | 11.9 | 10.9 | 12.0 |
| 1250 | 1250 | 50:50 | 200 | 18.8 | 10.7 | 11.1 |
| 1500 | 1000 | 60:40 | 204 | 22.6 | 11.2 | 10.3 |
| 1750 | 750 | 70:30 | 207 | 26.9 | 19.6 | 10.8 |
| 2000 | 500 | 80:20 | 212 | 27.9 | 17.7 | 10.1 |
| 2250 | 250 | 90:10 | 212 | 30.1 | 20.1 | 9.5 |
| 300 | 2700 | 10:90 | 194 | 11.2 | 10.5 | 11.0 |
| 600 | 2400 | 20:80 | 194 | 10.3 | 10.4 | 10.5 |
| 900 | 2100 | 30:70 | 191 | 10.6 | 10.4 | 11.3 |
| 1200 | 1800 | 40:60 | 196 | 13.0 | 9.9 | 10.3 |
| 1500 | 1500 | 50:50 | 202 | 19.7 | 9.8 | 10.1 |
| 1800 | 1200 | 60:40 | 206 | 23.8 | 12.5 | 10.1 |
| 2000 | 1000 | 66:33 | 208 | 25.2 | 13.7 | 10.5 |
| 2100 | 900 | 70:30 | 213 | 26.6 | 18.4 | 9.9 |
| 2400 | 600 | 80:20 | 213 | 30.5 | 28.1 | 9.6 |
| 2700 | 300 | 90:10 | 219 | 34.3 | 29.6 | 9.5 |
| 2000 | 1000 | 66:33 | 208 | 25.2 | 13.7 | 10.5 |
| 2000 | 1500 | 57:43 | 208 | 22.2 | 11.6 | 9.5 |
| 2000 | 2000 | 50:50 | 209 | 24.0 | 11.7 | 9.4 |

The results in Table 2 were used to prepare Haze Value/Solubility Point plots against 3,4-DMDBS:EDBS ratio for the total concentrations in resin (2500 ppm or 3000 ppm) and for different injection moulding temperatures (180° C. and 190° C.). These plots correspond to FIGS. 3 to 6. The results in Table 2, and FIGS. 3 to 6, demonstrate the synergistic effects in terms of solubility of the nucleating and clarifying agents and transparency of the polyolefin material prepared, which are simultaneously observed at 3,4-DMDBS:EDBS ratios according to the invention. In particular, these synergistic effects are observed at the lower than conventional injection moulding temperatures of 180° C. and 190° C. The results in Table 2 also demonstrate that suitable haze values are also obtained at higher injection moulding temperatures (200° C.), demonstrating that the invention can also be applied at conventional processing temperatures. Polyolefin materials prepared comprising 3,4-DMDBS and EDBS in a weight ratio in accordance with the present invention had good organoleptic properties. This is in contrast to polyolefin materials prepared with EDBS alone, which had a noticeable sweet odour. Meanwhile, adequate haze and organoleptic properties in nucleated and clarified polyolefin material is also shown to be possible where the weight ratio of bis-3,4-dimethylbenzylidene sorbitol to bis-p-ethylbenzylidene sorbitol used in the polyolefin resin composition is as high as 15:85 (as in the alternative aspect of the present invention), provided processing temperatures do not exceed 200° C.

Example 3

The solubility points of 3,4-DMDBS, EDBS and blends thereof at different concentrations in molten polypropylene "RACO" MFR 80 g/10 min were determined followed by determination of haze values for polypropylene materials prepared therefrom in accordance with the general procedure described above. The results are provided in Table 3 below.

TABLE 3

| 3,4-DMDBS (ppm) | EDBS (ppm) | 3,4-DMDBS:EDBS ratio | Solubility Point (° C.) | Haze (ASTM-D1003-61—1 mm) | | |
|---|---|---|---|---|---|---|
| | | | | IM-180° C. | IM-190° C. | IM-200° C. |
| 2000 | 0 | 100:0 | 215 | 47.7 | 45.9 | 12.6 |
| 2500 | 0 | 100:0 | 219 | 48.6 | 45.4 | 28.8 |
| 3000 | 0 | 100:0 | 223 | 51.2 | 47.5 | 37.8 |
| 0 | 2000 | 0:100 | — | 23.1 | 18.9 | 19.0 |
| 0 | 2500 | 0:100 | 187 | 24.3 | 19.1 | 18.4 |
| 0 | 3000 | 0:100 | 194 | 28.2 | 18.6 | 18.0 |
| 600 | 1400 | 30:70 | 195 | 18.7 | 17.9 | 18.2 |
| 800 | 1200 | 40:60 | 200 | 20.5 | 18.0 | 20.5 |
| 750 | 1750 | 30:70 | 196 | 18.9 | 16.9 | 16.9 |
| 1000 | 1500 | 40:60 | 202 | 20.3 | 14.4 | 13.5 |
| 900 | 2100 | 30:70 | 200 | 20.8 | 13.3 | 13.6 |
| 1200 | 1800 | 40:60 | 205 | 23.8 | 13.0 | 12.7 |

The results in Table 3 were used to prepare the Haze Value/Solubility Point plot against 3,4-DMDBS:EDBS ratio corresponding to FIG. 7 for a total concentration in resin of 2500 ppm and for an injection moulding temperature of 180° C. FIG. 7 and the results in Table 3 further demonstrate the synergistic effects described hereinbefore for ratios of 3,4-DMDBS to EDBS according to the invention with a polypropylene resin having a high MFR value (80 g/10 min). Polyolefin materials prepared comprising 3,4-DMDBS and EDBS in a weight ratio in accordance with the present invention had good organoleptic properties. This is in contrast to the polyolefin materials prepared with EDBS alone, which had a noticeable sweet odour.

Example 4

The solubility points of 3,4-DMDBS, EDBS and blends thereof at different concentrations in molten polypropylene "RACO" MFR 80 g/10 min were determined followed by determination of haze values for polypropylene materials prepared therefrom (0.5 mm plaque thickness) in accordance with the general procedure described above. The results are provided in Table 4 below.

TABLE 4

| 3,4-DMDBS (ppm) | EDBS (ppm) | 3,4-DMDBS:EDBS ratio | Solubility Point (° C.) | Haze (ASTM-D1003-61—0.5 mm) | |
|---|---|---|---|---|---|
| | | | | IM-190° C. | IM-200° C. |
| 2500 | 0 | 100:0 | 219 | 20.0 | 11.1 |
| 750 | 1750 | 30:70 | 195 | 3.7 | 3.5 |
| 1000 | 1500 | 40:60 | 202 | 3.8 | 3.8 |
| 0 | 2500 | 0:100 | 187 | 8.3 | 4.2 |

The results in Table 4 further demonstrate the synergistic effects described hereinbefore for ratios of 3,4-DMDBS to EDBS according to the invention with a polypropylene resin having a high MFR value (80 g/10 min). Polyolefin materials prepared comprising 3,4-DMDBS and EDBS in a weight ratio in accordance with the present invention had good organoleptic properties. This is in contrast to the polyolefin material prepared with EDBS alone, which had a noticeable sweet odour.

Example 5

The solubility points of 3,4-DMDBS, EDBS and blends thereof at different concentrations in molten polypropylene "RACO" MFR 80 g/10 min were determined followed by determination of haze values for polypropylene materials prepared therefrom (2.00 mm plaque thickness) in accordance with the general procedure described above. The results are provided in Table 5 below.

TABLE 5

| 3,4-DMDBS (ppm) | EDBS (ppm) | 3,4-DMDBS:EDBS ratio | Solubility Point (° C.) | Haze (ASTM-D1003-61—2.0 mm) IM-190° C. |
|---|---|---|---|---|
| 2500 | 0 | 100:0 | 219 | 77.4 |
| 750 | 1750 | 30:70 | 195 | 37.6 |
| 1000 | 1500 | 40:60 | 202 | 37.8 |
| 0 | 2500 | 0:100 | 187 | 43.9 |

The results in Table 5 further demonstrate the synergistic effects described hereinbefore for ratios of 3,4-DMDBS to EDBS according to the invention with a polypropylene resin having a high MFR value (80 g/10 min). Polyolefin materials prepared comprising 3,4-DMDBS and EDBS in a weight ratio in accordance with the present invention had good organoleptic properties. This is in contrast to the polyolefin material prepared with EDBS alone, which had a noticeable sweet odour.

Example 6

The solubility points of 3,4-DMDBS, EDBS and blends thereof at different concentrations in molten polypropylene "RACO" MFR 50 g/10 min were determined. Polyolefin materials were subsequently prepared by injection moulding the resin composition at various temperatures and the haze values determined as described in the general procedure above. The results provided below in Table 6 below.

TABLE 6

| 3,4-DMDBS (ppm) | EDBS (ppm) | 3,4-DMDBS:EDBS ratio | Solubility Point (° C.) | Haze (ASTM-D1003-61—1 mm) | | |
|---|---|---|---|---|---|---|
| | | | | IM-180° C. | IM-190° C. | IM-200° C. |
| 2000 | 0 | 100:0 | 212 | 41.3 | 33.6 | 14.8 |
| 2500 | 0 | 100:0 | 214 | 44.1 | 37.2 | 33.4 |
| 3000 | 0 | 100:0 | 223 | 44.0 | 41.0 | 36.1 |
| 0 | 2000 | 0:100 | — | 21.3 | 18.4 | 20.3 |
| 0 | 2500 | 0:100 | 186 | 22.4 | 17.6 | 19.2 |
| 0 | 3000 | 0:100 | 195 | 22.9 | 17.7 | 17.6 |
| 600 | 1400 | 30:70 | 194 | 15.4 | 15.5 | 17.3 |
| 800 | 1200 | 40:60 | 198 | 18.8 | 15.1 | 16.0 |
| 750 | 1750 | 30:70 | 195 | 19.2 | 12.6 | 14.8 |
| 1000 | 1500 | 40:60 | 201 | 21.0 | 12.0 | 13.0 |
| 900 | 2100 | 30:70 | 197 | 19.3 | 9.2 | 15.0 |
| 1200 | 1800 | 40:60 | 201 | 20.1 | 14.7 | 12.0 |

The results in Table 6 were used to prepare Haze Value/Solubility Point plots against 3,4-DMDBS:EDBS ratio for a total concentration in resin of 2500 ppm and 3000 ppm for an injection moulding temperature of 180° C., corresponding to FIGS. 8 and 9 respectively. FIGS. 7 and 8, and the results in Table 6, further demonstrate the synergistic effects described hereinbefore for ratios of 3,4-DMDBS to EDBS according to the invention with a polypropylene resin having MFR value of 50 g/10 min. Polyolefin materials prepared comprising 3,4-DMDBS and EDBS in a weight ratio in accordance with the present invention had good organoleptic properties. This is in contrast to the polyolefin materials prepared with EDBS alone, which had a noticeable sweet odour.

Example 7

The solubility points of 3,4-DMDBS, EDBS and blends thereof at different concentrations in molten polypropylene "RACO" MFR 48 g/10 min were determined. Polyolefin materials were subsequently prepared by injection moulding the resin composition at various temperatures and the haze values determined as described in the general procedure above. The results are provided below in Table 7 below.

TABLE 7

| 3,4-DMDBS (ppm) | EDBS (ppm) | 3,4-DMDBS:EDBS ratio | Solubility Point (° C.) | Haze (ASTM-D1003-61—1 mm) | | |
|---|---|---|---|---|---|---|
| | | | | IM-180° C. | IM-190° C. | IM-200° C. |
| 2000 | 0 | 100:0 | 211 | 43.3 | 39.9 | 13.4 |
| 2500 | 0 | 100:0 | 213 | 43 | 41.5 | 16.3 |
| 3000 | 0 | 100:0 | — | 46.7 | 45.2 | — |
| 0 | 2000 | 0:100 | — | 19.0 | 19.1 | 19.3 |
| 0 | 2500 | 0:100 | 184 | 21.1 | 18.1 | 19.0 |
| 0 | 3000 | 0:100 | 193 | 25.4 | 17.6 | 17.7 |
| 600 | 1400 | 30:70 | 193 | 17.2 | 17.9 | 17.5 |
| 800 | 1200 | 40:60 | 195 | 17.0 | 16.6 | 16.4 |
| 750 | 1750 | 30:70 | 195 | 17.5 | 14.8 | 14.7 |
| 1000 | 1500 | 40:60 | 198 | 22.3 | 14.3 | 14.0 |
| 900 | 2100 | 30:70 | 199 | 16.1 | 13.8 | 13.7 |
| 1200 | 1800 | 40:60 | 202 | 22.0 | 13.1 | 12.1 |

The results in Table 7 further demonstrate the synergistic effects described hereinbefore for ratios of 3,4-DMDBS to EDBS according to the invention with a polypropylene resin having MFR value of 48 g/10 min. Polyolefin materials prepared comprising 3,4-DMDBS and EDBS in a weight ratio in accordance with the present invention had good organoleptic properties. This is in contrast to the polyolefin materials prepared with EDBS alone, which had a noticeable sweet odour.

Example 8

The solubility points of 3,4-DMDBS, EDBS and blends thereof at a concentration of 2000 ppm in molten polypropylene "RACO" MFR 40 g/10 min were determined. Polyolefin materials were subsequently prepared by injection moulding the resin composition at various temperatures and the haze values determined as described in the general procedure above. The results are provided below in Table 8 below.

TABLE 8

| 3,4-DMDBS (ppm) | EDBS (ppm) | 3,4-DMDBS:EDBS ratio | Solubility Point (° C.) | Haze (ASTM-D1003-61—1 mm) | | |
|---|---|---|---|---|---|---|
| | | | | IM-180° C. | IM-190° C. | IM-200° C. |
| 0 | 2000 | 0:100 | 193 | 25.6 | 18.4 | 18.8 |
| 2000 | 0 | 100:0 | 207 | 47.4 | 36 | 25.1 |
| 200 | 1800 | 10:90 | 192 | 19.4 | 17.3 | 17.9 |
| 400 | 1600 | 20:80 | 191 | 17.7 | 15.4 | 16.0 |
| 500 | 1500 | 25:75 | 191 | 14.9 | 14.9 | 15.4 |
| 600 | 1400 | 30:70 | 190 | 15.4 | 14.7 | 15.3 |
| 800 | 1200 | 40:60 | 190 | 17.0 | 15.0 | 15.2 |
| 1000 | 1000 | 50:50 | 191 | 21.9 | 15.3 | 15.4 |
| 1200 | 800 | 60:40 | 198 | 29.1 | 18.2 | 14.9 |
| 1400 | 600 | 70:30 | 203 | 38.9 | 20.6 | 14.4 |
| 1600 | 400 | 80:20 | 204 | 43.2 | 31 | 13.2 |
| 1800 | 200 | 90:10 | 206 | 48.4 | 29.8 | 17.2 |

The results in Table 8 further demonstrate the synergistic effects described hereinbefore for ratios of 3,4-DMDBS to EDBS according to the invention with a polypropylene resin having MFR value of 40 g/10 min. Polyolefin materials prepared comprising 3,4-DMDBS and EDBS in a weight ratio in accordance with the present invention had good organoleptic properties. This is in contrast to the polyolefin materials prepared with EDBS alone, which had a noticeable sweet odour.

Example 9

The haze values were determined for a series of polyolefin materials prepared from blends of 3,4-DMDBS and EDBS at a concentration of 2000 ppm in molten polypropylene "RACO" MFR 40 g/10 min. One set of polyolefin materials was prepared by melt compounding the blend of 3,4-DMDBS and EDBS and RACO and extruding at 190° C. before injection moulding the resin composition at various temperatures. Another set of polyolefin materials was prepared by mixing the blend of 3,4-DMDBS and EDBS and powdered RACO before injection moulding at various temperatures. The results are provided below in Table 9a and Table 9b below.

TABLE 9a preparation includino extrusion

| 3,4-DMDBS (ppm) | EDBS (ppm) | 3,4-DMDBS:EDBS ratio | Haze (ASTM-D1003-61—1 mm) | | |
|---|---|---|---|---|---|
| | | | IM-180° C. | IM-190° C. | IM-200° C. |
| 0 | 2000 | 0:100 | 25.6 | 18.4 | 18.8 |
| 400 | 1600 | 20:80 | 19.7 | 15.4 | 16.0 |

TABLE 9a-continued preparation includino extrusion

| 3,4-DMDBS (ppm) | EDBS (ppm) | 3,4-DMDBS:EDBS ratio | Haze (ASTM-D1003-61—1 mm) | | |
|---|---|---|---|---|---|
| | | | IM-180° C. | IM-190° C. | IM-200° C. |
| 500 | 1500 | 25:75 | 14.9 | 14.9 | 15.4 |
| 600 | 1400 | 30:70 | 15.4 | 14.7 | 15.3 |
| 800 | 1200 | 40:60 | 17.0 | 15.0 | 15.2 |
| 2000 | 0 | 100:0 | 21.9 | 15.3 | 15.4 |

TABLE 9b preparation without extrusion

| 3,4-DMDBS (ppm) | EDBS (ppm) | 3,4-DMDBS:EDBS ratio | Haze (ASTM-D1003-61—1 mm) | | | |
|---|---|---|---|---|---|---|
| | | | IM-170° C. | IM-180° C. | IM-190° C. | IM-200° C. |
| 0 | 2000 | 0:100 | 38.8 | 26.9 | 20.2 | 20.7 |
| 400 | 1600 | 20:80 | 35.6 | 22.1 | 16.4 | 17.4 |
| 500 | 1500 | 25:75 | 32.5 | 15.8 | 16.3 | 16.9 |
| 600 | 1400 | 30:70 | 23.5 | 16.0 | 16.3 | 16.3 |
| 800 | 1200 | 40:60 | 27.4 | 19.7 | 16.3 | 16.4 |
| 2000 | 0 | 100:0 | 54.9 | 54.4 | 39.0 | 13.5 |

A comparison of the haze values of Tables 9a and 9b illustrates the additional advantage of including a melt compounding and extrusion step prior to moulding of the resin composition in the preparation of the polyolefin material. In particular, a reduction in haze values is exhibited by melt compounding and extruding the resin composition prior to moulding to prepare the polyolefin material in comparison to just mixing the components of the resin composition and moulding only. Thus, in order to enhance the effects of the present invention, the polyolefin material may be prepared by melt compounding and extruding the resin composition prior to injection moulding to form the polyolefin material.

Example 10

The melting point of various blends of 3,4-DMDBS and EDBS were determined to assess the effect of the relative proportions of the components on the melting point of the blend. Results are provided in Table 10 below together with the solubility points for the majority of blends in molten polypropylene "RACO" MFR 40 g/10 min at a concentration of 2000 ppm. Then trend of melting points for the various blends is also represented graphically in FIG. 10.

TABLE 10

| 3,4-DMDBS (ppm) | EDBS (ppm) | 3,4-DMDBS:EDBS ratio | m.p. (° C.) | Solubility Point (° C.) |
|---|---|---|---|---|
| 0 | 2000 | 0:100 | 244.9 | 193 |
| 500 | 1500 | 25:75 | 244.0 | — |
| 600 | 1400 | 30:70 | 241.8 | 190 |
| 800 | 1200 | 40:60 | 241.9 | 190 |
| 1000 | 1000 | 50:50 | 243.7 | 191 |
| 1100 | 900 | 55:45 | 249.1 | — |
| 1200 | 800 | 60:40 | 251.2 | 198 |
| 1500 | 500 | 25:75 | 257.5 | — |
| 2000 | 0 | 100:0 | 275.3 | 207 |

The results in Table 10 (as well as FIG. 10) illustrate that the melting point of the blend does not merely reflect the respective melting points of the two components of the blend and their relative proportions in each of the blends. Surprisingly, the results indicate that the blends form a eutectic system having a eutectic point, where the melting point of the blend is lowest and lower than the respective melting points of the individual components alone, for a 3,4-DMDBS to EDBS ratio of approximately 30:70. It will also be appreciated that this eutectic blend of 3,4-DMDBS and EDBS also coincides with the blend of 3,4-DMDBS and EDBS exhibiting one of the lowest solubility points in the molten resin.

The surprising eutectic system exhibited by the blend of 3,4-DMDBS and EDBS is considered to further illustrate the effects of the invention. Without being bound by any particular theory, it is believed that the correlation observed between the melting point of the blends and the solubility point of the blend in molten resin indicates that the eutectic properties of the blend contribute to the ability of the resin composition to be processed at lower than conventional temperatures to form a clarified and/or nucleated polyolefin material having excellent haze properties.

Example 11

The solubility points of 3,4-DMDBS, EDBS and blends thereof at a concentration of 1000 ppm and 5000 ppm in molten polypropylene "RACO" MFR 70 g/10 min were determined. Polyolefin materials were subsequently prepared by injection moulding the resin composition at various temperatures and the haze values determined as described in the general procedure above. The results are provided below in Table 11 below.

TABLE 11

| 3,4-DMDBS (ppm) | EDBS (ppm) | 3,4-DMDBS: EDBS ratio | Solubility Point (° C.) | Haze (ASTM-D1003-61—1 mm) | | |
|---|---|---|---|---|---|---|
| | | | | IM-180° C. | IM-190° C. | IM-200° C. |
| 1000 | 0 | 0:100 | 198 | 38.7 | 25.3 | 25.8 |
| 5000 | 0 | 0:100 | 234 | 48.4 | 46.9 | 42.5 |
| 0 | 1000 | 100:0 | 192 | 25.8 | 26.6 | 28.2 |
| 0 | 5000 | 100:0 | 216 | 23.8 | 16 | 13.7 |
| 300 | 700 | 30:70 | 191 | 30.7 | 31.3 | 31.7 |
| 1500 | 3500 | 30:70 | 208 | 19.5 | 16.6 | 12.2 |
| 600 | 400 | 60:40 | 192 | 31.8 | 30.7 | 32.2 |
| 3000 | 2000 | 60:40 | 223 | 24.7 | 24.4 | 18.9 |

The results in Table 11 further demonstrate the synergistic effects described hereinbefore for ratios of 3,4-DMDBS to EDBS according to the invention with a polypropylene resin having MFR value of 70 g/10 min. Polyolefin materials prepared comprising 3,4-DMDBS and EDBS in a weight ratio in accordance with the present invention had good organoleptic properties. This is in contrast to the polyolefin materials prepared with EDBS alone, which had a noticeable sweet odour. The results of Table 11 also demonstrate that synergistic effects are observed for relatively low total 3,4-DMDBS and EDBS concentrations (1000 ppm) as well as relatively high concentrations (5000 ppm).

Example 12

The solubility points of 3,4-DMDBS, EDBS and blends thereof at a concentration of 1000 ppm and 5000 ppm in molten polypropylene "RACO" MFR 25 g/10 min were determined. Polyolefin materials were subsequently prepared by injection moulding the resin composition at various temperatures and the haze values determined as described in the general procedure above. The results are provided below in Table 12 below.

TABLE 12

| 3,4-DMDBS (ppm) | EDBS (ppm) | 3,4-DMDBS: EDBS ratio | Solubility Point (° C.) | Haze (ASTM-D1003-61—1 mm) | | |
|---|---|---|---|---|---|---|
| | | | | IM-180° C. | IM-190° C. | IM-200° C. |
| 1000 | 0 | 0:100 | 201 | 28.7 | 20.1 | 20.5 |
| 5000 | 0 | 0:100 | 233 | 47.2 | 45.7 | 42.6 |
| 0 | 1000 | 100:0 | 190 | 17.1 | 18.3 | 19.5 |
| 0 | 5000 | 100:0 | 219 | 24.2 | 15.9 | 11.9 |
| 300 | 700 | 30:70 | 196 | 22 | 23.5 | 24.2 |
| 1500 | 3500 | 30:70 | 209 | 19.1 | 14 | 9.2 |
| 600 | 400 | 60:40 | 197 | 23.2 | 25.1 | 26.6 |
| 3000 | 2000 | 60:40 | 221 | 26.9 | 26.1 | 18.6 |

The results in Table 12 further demonstrate the synergistic effects described hereinbefore for ratios of 3,4-DMDBS to EDBS according to the invention with a polypropylene resin having MFR value of 25 g/10 min. Polyolefin materials prepared comprising 3,4-DMDBS and EDBS in a weight ratio in accordance with the present invention had good organoleptic properties. This is in contrast to the polyolefin materials prepared with EDBS alone, which had a noticeable sweet odour. The results of Table 12 also demonstrate that synergistic effects are observed for relatively low total 3,4-DMDBS and EDBS concentrations (1000 ppm) as well as relatively high concentrations (5000 ppm).

Example 13

The solubility points of 3,4-DMDBS, EDBS and blends thereof at a concentration of 1000 ppm and 5000 ppm in molten polypropylene "RACO" MFR 7 g/10 min were determined. Polyolefin materials were subsequently prepared by injection moulding the resin composition at various temperatures and the haze values determined as described in the general procedure above. The results are provided below in Table 13 below.

TABLE 13

| 3,4-DMDBS (ppm) | EDBS (ppm) | 3,4-DMDBS: EDBS ratio | Solubility Point (° C.) | Haze (ASTM-D1003-61—1 mm) | | |
|---|---|---|---|---|---|---|
| | | | | IM-180° C. | IM-190° C. | IM-200° C. |
| 1000 | 0 | 0:100 | 204 | 14.5 | 18.2 | 17.6 |
| 5000 | 0 | 0:100 | 229 | 41.5 | 41.4 | 31 |
| 0 | 1000 | 100:0 | 185 | 16.5 | 15.8 | 15.6 |
| 0 | 5000 | 100:0 | 207 | 13.9 | 9.3 | 9.3 |
| 300 | 700 | 30:70 | 189 | 18.3 | 18.1 | 17.4 |
| 1500 | 3500 | 30:70 | 207 | 16.7 | 8.5 | 8.6 |
| 600 | 400 | 60:40 | 199 | 18.8 | 18.9 | 18.6 |
| 3000 | 2000 | 60:40 | 219 | 28.6 | 27.5 | 9.3 |

The results in Table 13 further demonstrate the synergistic effects described hereinbefore for ratios of 3,4-DMDBS to EDBS according to the invention with a polypropylene resin having MFR value of 7 g/10 min. Polyolefin materials prepared comprising 3,4-DMDBS and EDBS in a weight ratio in accordance with the present invention had good organoleptic properties. This is in contrast to the polyolefin materials prepared with EDBS alone, which had a noticeable sweet odour. The results of Table 13 also demonstrate that synergistic effects are observed for relatively low total 3,4-DMDBS and EDBS concentrations (1000 ppm) as well as relatively high concentrations (5000 ppm).

Example 14

The solubility points of blends of 3,4-DMDBS and EDBS (30:70), at a concentration of 2500 ppm in molten polypropylene "RACO" MFR 70 g/10 min, with varying amounts of optical brightener (OB) additive were determined. Polyolefin materials were subsequently prepared by injection moulding the resin composition at various temperatures and the haze values determined as described in the general procedure above. The optical brightener (OB) which was used was Ciba® Tinopal® OB (2,5-bis(5-tert-butyl-benzoxazol-2-yl)thiophene; CAS #7128-64-5) which was sourced from Ciba Specialty Chemicals.

Yellowness Index (YI) for each of the polyolefin materials prepared by injection moulding at 190° C. was also determined in accordance with ASTM E313 for a 2 mm thick plaque. In addition, a 5-member panel judged the appearance (based on colour/yellowness and clarity) of this same set of polyolefin materials in a blind test and ranked the different polyolefin materials accordingly (1 being the polyolefin material with the best appearance, 6 being the polyolefin material with the least appealing appearance). The results are provided in Table 14 below.

TABLE 14

| OB (wt. %[1]) | Solubility Point (° C.) | Haze (ASTM-D1003-61—1 mm) | | | YI (2 mm) IM- 190° C. | Appearance Test | | | | | |
|---|---|---|---|---|---|---|---|---|---|---|---|
| | | IM- 180° C. | IM- 190° C. | IM- 200° C. | | 1 | 2 | 3 | 4 | 5 | Av. |
| — | 198 | 16.3 | 13 | 12.9 | 11.6 | 6 | 6 | 6 | 6 | 1 | 5 |
| 0.10 | 195 | 18.3 | 12.7 | 13.7 | 8.1 | 5 | 5 | 5 | 5 | 6 | 5.2 |
| 0.50 | 197 | 18.4 | 13.2 | 14 | 1.5 | 4 | 1 | 4 | 4 | 4 | 3.4 |
| 1.00 | 198 | 16.1 | 13.3 | 13.7 | -1.9 | 3 | 1 | 3 | 1 | 5 | 2.6 |
| 1.50 | 197 | 13.5 | 13.3 | 14.1 | -3.5 | 1 | 1 | 1 | 1 | 3 | 1.4 |
| 2.00 | 197 | 14.2 | 13.3 | 14 | -4.6 | 2 | 4 | 2 | 1 | 2 | 2.2 |

[1]weight % of optical brightener relative to total concentration of nucleator/clarifier
[2]Negative values of YI denote departure toward blue.

The results in Table 14 further demonstrate the synergistic effects described hereinbefore for ratios of 3,4-DMDBS to EDBS according to the invention with a polypropylene resin having MFR value of 70 g/10 min. Furthermore, the results in Table 14 demonstrate that these synergistic effects are not diminished by the presence of optical brightener. The presence of optical brightener has a significant impact on reduction of yellowness, as shown by the substantial reduction in Yellow Index (YI) value. The results of the "blind" appearance test for the polyolefin materials prepared having different amounts of optical brightener demonstrate that the presence of optical brightener generally improves the ranking of the polyolefin material compared to the polyolefin material comprising no optical brightener. Moreover, increasing the amount of optical brightener generally increases the ranking of the polyolefin material in the appearance test across the concentrations tested.

Example 15

The solubility points of blends of 3,4-DMDBS and EDBS (30:70), at a concentration of 3000 ppm in molten polypropylene "RACO" MFR 70 g/10 min, with varying amounts of optical brightener (OB) additive were determined. Polyolefin materials were subsequently prepared by injection moulding the resin composition at various temperatures and the haze values determined as described in the general procedure above. The optical brightener (OB) which was used was Ciba® Tinopal® OB (2,5-bis(5-tert-butyl-benzoxazol-2-yl)thiophene; CAS #7128-64-5) which was sourced from Ciba Specialty Chemicals.

Yellowness Index (YI) for each of the polyolefin materials prepared by injection moulding at 190° C. was also determined in accordance with ASTM E313 for a 2 mm thick plaque. In addition, a 5-member panel judged the appearance (based on colour/yellowness and clarity) of this same set of polyolefin materials in a blind test and ranked the different polyolefin materials accordingly (1 being the polyolefin material with the best appearance, 6 being the polyolefin material with the least appealing appearance). The results are provided in Table 15 below.

TABLE 15

| OB (wt. %[1]) | Solubility Point (° C.) | Haze (ASTM-D1003-61—1 mm) | | | YI (2 mm) IM- 190° C. | Appearance Test | | | | | |
|---|---|---|---|---|---|---|---|---|---|---|---|
| | | IM- 180° C. | IM- 190° C. | IM- 200° C. | | 1 | 2 | 3 | 4 | 5 | Av. |
| — | 199 | 17.1 | 13.4 | 12.2 | 11.7 | 6 | — | 6 | 6 | 6 | 6 |
| 0.10 | 201 | 17.3 | 12.1 | 12.6 | 6.1 | 5 | — | 5 | 5 | 5 | 5 |
| 0.50 | 199 | 17.7 | 12.5 | 12.5 | 0.4 | 4 | — | 4 | 2 | 4 | 3.5 |
| 1.00 | 200 | 17.3 | 12.9 | 12.4 | -2.4 | 2 | — | 2 | 4 | 1 | 2.25 |
| 1.50 | 201 | 17.8 | 12.2 | 12.7 | -3.7 | 3 | — | 3 | 3 | 2 | 2.75 |
| 2.00 | 199 | 17.6 | 12 | 13.2 | -4.9 | 1 | — | 1 | 1 | 3 | 1.5 |

[1]weight % of optical brightener relative to total concentration of nucleator/clarifier
[2]Negative values of YI denote departure toward blue.

The results in Table 15 further demonstrate the synergistic effects described hereinbefore for ratios of 3,4-DMDBS to EDBS according to the invention with a polypropylene resin having MFR value of 70 g/10 min. Furthermore, the results in Table 15 demonstrate that these synergistic effects are not diminished by the presence of optical brightener. The presence of optical brightener has a significant impact on reduction of yellowness, as shown by the substantial reduction in Yellow Index (YI) value. The results of the "blind" appearance test for the polyolefin materials prepared having different amounts of optical brightener demonstrate that the presence of optical brightener generally improves the ranking of the polyolefin material compared to the polyolefin material comprising no optical brightener. Moreover, increasing the amount of optical brightener generally increases the ranking of the polyolefin material in the appearance test across the concentrations tested.

The invention claimed is:
1. A method for forming a polyolefin material, said method comprising:
(i) preparing a polyolefin resin composition comprising polyolefin resin, one or more optical brighteners and bis-3,4-dimethylbenzylidene sorbitol and bis-p-ethylbenzylidene sorbitol, wherein the weight ratio of bis-3,4-dimethylbenzylidene sorbitol to bis-p-ethylbenzylidene sorbitol in the polyolefin resin composition is 45:55 to 25:75; and
(ii) processing said polyolefin resin composition to form said polyolefin material.

2. The method according to claim 1, wherein processing of the polyolefin resin composition to form said polyolefin material is conducted at a temperature of from 180° C. to 245° C.

3. A method for forming a polyolefin material, said method comprising:
   (i) preparing a polyolefin resin composition comprising polyolefin resin, one or more optical brighteners, bis-3,4-dimethylbenzylidene sorbitol and bis-p-ethylbenzylidene sorbitol, wherein the weight ratio of bis-3,4-dimethylbenzylidene sorbitol to bis-p-ethylbenzylidene sorbitol in the polyolefin resin composition is 45:55 to 15:85; and
   (ii) processing said polyolefin resin composition to form said polyolefin material, wherein processing of the polyolefin resin composition to form said polyolefin material is conducted at a temperature of no more than 200° C.

4. The method according to claim 1, wherein processing of the polyolefin resin composition to form said polyolefin material is conducted at a temperature of from 180° C. to 200° C.

5. The method according to claim 1, wherein processing of the polyolefin resin composition comprises injection and/or extrusion molding the polyolefin resin composition.

6. The method according to claim 1, wherein the weight ratio of bis-3,4-dimethylbenzylidene sorbitol to bis-p-ethylbenzylidene sorbitol in the polyolefin resin composition is 40:60 to 25:75.

7. The method according to claim 1, wherein the weight ratio of bis-3,4-dimethylbenzylidene sorbitol to bis-p-ethylbenzylidene sorbitol in the polyolefin resin composition is 32:68 to 28:72.

8. The method according to claim 1, wherein the combined amount of bis-3,4-dimethylbenzylidene sorbitol and bis-p-ethylbenzylidene sorbitol in the polyolefin resin composition is from 1000 ppm to 5000 ppm, by weight of the polyolefin resin composition.

9. The method according to claim 1, wherein the one or more optical brighteners are selected from bis-benzoxazoles, phenylcoumarins, methylcoumarins, bis-(styryl)biphenyls, and combinations thereof.

10. The method according to claim 9, wherein the one or more optical brighteners are selected from 2,5-bis(5-tert-butyl-benzoxazol-2-yl)thiophene, 4,4'-bis-benzoxazolylstilbene, 3-phenyl-7-(4-methyl-6-butyloxybenzoxazole)coumarin and 4-methyl-7-diethylamincoumarin.

11. The method according to claim 1, wherein the total amount of the one or more optical brighteners in the polyolefin resin composition is from 1 to 100 ppm, by weight of the polyolefin resin composition.

12. The method according to claim 1, wherein the polyolefin resin has a melt flow rate of 5 g/10 min or above, as measured according to ASTM method D1238-04.

13. The method according to claim 1, wherein the polyolefin material has a haze value, as measured in accordance with ASTM D1003-61 for a 1 mm thick plaque, of below 20%.

14. A nucleating and clarifying additive composition comprising or consisting essentially of one or more optical brighteners, bis-3,4-dimethylbenzylidene sorbitol and bis-pethylbenzylidene sorbitol, wherein the weight ratio of bis-3,4-dimethylbenzylidene sorbitol to bis-p-ethylbenzylidene sorbitol in the additive composition is 45:55 to 25:75.

15. The nucleating and clarifying additive composition according to claim 14, wherein the one or more optical brighteners are selected from bis-benzoxazoles, phenylcoumarins, methylcoumarins, bis-(styryl)biphenyls, and combinations thereof.

16. The nucleating and clarifying additive composition according to claim 15, wherein the one or more optical brighteners are selected from 2,5-bis(5-tert-butyl-benzoxazol-2-yl)thiophene, 4,4'-bis-benzoxazolylstilbene, 3-phenyl-7-(4-methyl-6-butyloxybenzoxazole)coumarin and 4-methyl-7-diethylamincoumarin.

17. A polyolefin resin composition comprising: polyolefin resin, one or more optical brighteners and bis-3,4-dimethylbenzylidene sorbitol and bis-p-ethylbenzylidene sorbitol, wherein the weight ratio of bis-3,4-dimethylbenzylidene sorbitol to bis-p-ethylbenzylidene sorbitol in the polyolefin resin composition is 45:55 to 25:75.

18. A polyolefin material comprising: (a) polyolefin; (b) bis-3,4-dimethylbenzylidene sorbitol; (c) bis-p-ethylbenzylidene sorbitol; and (d) one or more optical brighteners; wherein the weight ratio of bis-3,4-dimethylbenzylidene sorbitol to bis-pethylbenzylidene sorbitol in the polyolefin material is from 45:55 to 25:75.

19. A polyolefin material according to claim 18, wherein i) the polyolefin material has a haze value, as measured in accordance with ASTM D1003-61 for a 1 mm thick plaque, of below 20%, and/or ii) wherein the polyolefin material has a Yellowness index, as measured in accordance with ASTM E313 for a 2 mm thick plaque, of less than 7.5.

20. A polyolefin material prepared:
   i) by preparing a polyolefin resin composition comprising polyolefin resin, one or more optical brighteners, bis-3,4-dimethylbenzylidene sorbitol and bis-p-ethylbenzylidene sorbitol, wherein the weight ratio of bis-3,4-dimethylbenzylidene sorbitol to bis-p-ethylbenzylidene sorbitol in the polyolefin resin composition is 45:55 to 15:85; and processing said polyolefin resin composition to form said polyolefin material, wherein processing of the polyolefin resin composition to form said polyolefin material is conducted at a temperature of no more than 200° C.; or
   ii) from a polyolefin resin comprising one or more optical brighteners having a melt flow rate of least 40 g/10 min, as measured in accordance with ASTM method D1238-04, which when molded at 180° C. has a haze value of less than 20%, as measured in accordance with ASTM D1003-61 for a plaque of 1 mm thickness, and a Yellowness Index of less than 2.5, as measured in accordance with ASTM E313 for a 2 mm thick plaque.

* * * * *